US010289720B2

(12) United States Patent
Ferrari et al.

(10) Patent No.: US 10,289,720 B2
(45) Date of Patent: May 14, 2019

(54) INFORMATION RETRIEVAL AND NAVIGATION USING A SEMANTIC LAYER AND DYNAMIC OBJECTS

(71) Applicant: Oracle International Corporation, Redwood Shores, CA (US)

(72) Inventors: Adam Ferrari, Cambridge, MA (US); Joshua William Kapell, Brooklyn, NY (US); Jason Furtado, Boston, MA (US); Matthew L. Brandwein, San Francisco, CA (US); Spiro Michaylov, Kirkland, WA (US); Omri Traub, Brookline, MA (US); Vladimir Zelevinsky, Sharon, MA (US); John Huffaker, Boston, MA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 15/237,948

(22) Filed: Aug. 16, 2016

(65) Prior Publication Data

US 2016/0357813 A1 Dec. 8, 2016

Related U.S. Application Data

(63) Continuation of application No. 13/495,304, filed on Jun. 13, 2012, now Pat. No. 9,449,068.

(51) Int. Cl.
*G06F 17/30* (2006.01)

(52) U.S. Cl.
CPC .. *G06F 17/30457* (2013.01); *G06F 17/30595* (2013.01)

(58) Field of Classification Search
USPC .............. 707/607, 609, 687, 705, 790, 813
See application file for complete search history.

(56) References Cited

U.S. PATENT DOCUMENTS

| | | |
|---|---|---|
| 6,012,053 A | 1/2000 | Pant et al. |
| 6,035,294 A | 3/2000 | Fish |
| 6,195,652 B1 | 2/2001 | Fish |
| 6,199,059 B1 | 3/2001 | Dahan |
| 6,243,699 B1 | 6/2001 | Fish |
| 6,282,532 B1 | 8/2001 | Sandell |
| 7,765,178 B1 * | 7/2010 | Roizen ............. G06F 17/30687 |

(Continued)

*Primary Examiner* — Sana A Al-Hashemi
(74) *Attorney, Agent, or Firm* — Potomac Law Group, PLLC

(57) ABSTRACT

Systems and methods for information retrieval are provided that permit users and/or processing entities to access and define synthetic data, synthetic objects, and/or synthetic groupings of data in one or more collections of information. In one embodiment, data access on an information retrieval system can occur through an interpretation layer which interprets any synthetic data against data physically stored in the collection. Synthetic data can define virtual data objects, virtual data elements, virtual data attributes, virtual data groupings, and/or data entities that can be interpreted against data that may be stored physically in the collection of information. The system and methods for information retrieval can return results from the one or more collections of information based not only on the data stored, but also on the virtual data generated from interpretation of the stored data.

20 Claims, 20 Drawing Sheets

(56) References Cited

U.S. PATENT DOCUMENTS

| | | | |
|---|---|---|---|
| 8,332,393 B2* | 12/2012 | Elyada | G06F 17/30864 |
| | | | 707/722 |
| 2008/0270398 A1 | 10/2008 | Landau | |
| 2009/0254529 A1 | 10/2009 | Goldentouch | |
| 2009/0287669 A1* | 11/2009 | Bennett | G06F 17/30265 |
| 2010/0070725 A1 | 3/2010 | Prahlad | |
| 2011/0205341 A1 | 8/2011 | Wilson | |
| 2011/0121423 A1 | 9/2011 | Lopiano | |
| 2011/0295624 A1 | 12/2011 | Chapin | |

* cited by examiner

230

- Ⓐ TYPE: TRANSACTION
- Ⓑ ITEM: PRODUCT NAME
- Ⓒ DATE: XX/XX/XXXX
- Ⓓ QUANT: XX
- Ⓔ PRICE: $XXX
- Ⓕ CUST: BILL SMITH
- Ⓖ PROFIT MARGIN: OBJECT

240

- Ⓐ TYPE: PROFIT MARGIN
- Ⓑ ACTION: EXECUTE OPERATION ON COST / PRICE / SALES UNITS / DATE RANGE
- Ⓒ CALCULATE: NET SALES LESS COST DIVIDE NET SALES
- Ⓓ UNITS: %
- Ⓔ NAME: PROFIT MARGIN

FIG.2B

INFORMATION RETRIEVAL AND NAVIGATION USING A SEMANTIC LAYER AND DYNAMIC OBJECTS

RELATED APPLICATIONS

This application is a continuation of U.S. patent application Ser. No. 13/495,304, filed on Jun. 13, 2012, the specification of which is hereby incorporated by reference.

BACKGROUND

Business enterprises rely on their ability to access and understand large volumes of heterogeneous data, that is, data of mixed organization and/or a variety of sources of information in a variety of organization formats. As the volume of the business data has steadily increased, the difficulty in understanding and interacting with the large volume of data has also increased, and typically at a greater rate than the data growth. A typical business relies on a wide range of heterogeneous data in situations where the data itself may be rapidly evolving. For example, stock items are ordered from a variety of vendors via purchase orders, entering inventory as they are received, the associated data sometimes having particular formats, and sometimes having different formats, or utilizing a previously unrecognized formats. In addition, customers place sales orders which are fulfilled from inventory, creating shipping waybills, invoices, and account statements with comparable data format variations. Periodically, a company aggregates these individual transactions into reports which may be organized by sales region, by month or quarter, or by product line. Modern companies need the ability to generate these reports quickly, efficiently, and as they are needed. However, significant time and effort can be required to generate useful analysis under conventional approaches.

Some conventional relational database management systems ("RDBMS") manage such disparate sets of information by consolidating comparable elements into relatively homogeneous tables linked by associations. For example, there may be a table of vendors, each of which is associated with products they supply in an inventory table, which in turn is associated with orders in an order table also associated with a table of customers and with tables of billing and shipping records. These pre-constructed data connections and layouts are called the database schema. Design of database schemas can profoundly affect both data consistency and database performance. This can be especially true for transaction-oriented database update operations necessary for applications such as inventory management.

These highly structured databases are efficient but inflexible, a limitation often revealed when, for example, the database used to maintain transactional sales and inventory information is also used as a source of aggregate information. Attempting to aggregate information into end-of-month or end-of-quarter reports from transactional sales and inventory information can be a significant burden. The report generation requires access to many records per query and many data fields per record. Aggregation and reporting is a usage domain for which conventional RDBMS systems are not optimized. Indeed, the update-in-place operations that facilitate transactional efficiency in a RDBMS tend to thwart, for example, long term trend analysis by overwriting historical data with updated data, requiring coarser-grained time series solutions such as snapshots and external data marts to be applied.

In some systems, programmatic logic can be maintained in application programs. When executed the logic generates business reports. The reporting logic typically includes carefully crafted SQL requests to the RDBMS to, for example, create a list of active customers for a given month through analysis of all sales for that month. Modifying such reports or adding additional sources of data to the repository can potentially require changing both the database schema and the business logic within the application program which accesses it.

Other approaches have attempted to address some of these issues. In recent years alternative forms of data storage have been developed which are optimized for interactive analysis and report generation. Some approaches forgo the rigid structure and fast transactional processing capabilities of the RDBMS for a more flexible data layout optimized for performance under the read-oriented query load of report generation and analysis. In such a system, heterogeneous records are grouped together rather than being partitioned into distinct tables; the concept of "schema" is thus less applicable to the overall data layout of the entire database, and more to the particular attributes associated with any given data record. Although popularly called "schema-less" databases, such systems are more accurately identified as "self-describing" or "schema per record" systems.

Such database organizations can be distinct from, but may also be combined with physical storage adaptations such as a "column based" rather than "row based" data storage architectures. Such data storage architectures can optimize for data read access when data for particular subsets of attributes (i.e., column) must be evaluated across a wide range of records (i.e., rows), as may often be seen during report generation or interactive data analysis.

Still, some conventional approaches do not address all the needs associated with understanding and interacting with large volumes of rapidly evolving data.

SUMMARY

Embodiments include systems and methods for information retrieval are provided that permit users and/or processing entities to access and define synthetic data, synthetic objects, and/or synthetic groupings of data in one or more collections of information. In one embodiment, data access on an information retrieval system can occur through an interpretation layer which interprets any synthetic data against data physically stored in the collection. Synthetic data can define virtual data objects, virtual data elements, virtual data attributes, virtual data groupings, and/or data entities that can be interpreted against data that may be stored physically in the collection of information. The system and methods for information retrieval can return results from the one or more collections of information based not only on the data stored, but also on the virtual data generated from interpretation of the stored data.

BRIEF DESCRIPTION OF THE DRAWINGS

FIG. 2B illustrates example data objects including synthetic data according to one embodiment of the present invention;

DETAILED DESCRIPTION

Embodiments are directed to information retrieval systems and methods that dynamically adapt to rapidly evolving data sources. The information retrieval systems and methods are configured to facilitate user interaction with large volumes of heterogeneous data. In one embodiment, the data sources that form a collection of information associated with the information retrieval system can be organized based on facets. Facets represent collections of database objects sharing a common relationship or attribute. In response to selection(s) and/or de-selection(s) of facets within, for example, a user interface, the system can return subsets of data from the collection of information that correspond to the facet selections. The faceted user interface can be configured to allow end-users or processing entities to access and navigate within any collection of information using "faceted navigation" operations, discussed in greater detail below.

Other embodiments of information retrieval systems support different methods of interacting with data stored in collections of information. The data in the collections of information can be stored in any format, including for example, structured data records organized by a data schema defining relationships between data tables. Other data organization models can also be employed, including for example, relational data models, structured data models, unstructured data models, semantic data models, etc.

In one embodiment, the information retrieval system can be configured to provide a query interface for accessing and/or interacting with data stored under any format in a collection of information to return subsets of the data. In another embodiment, the query interface can be provided in conjunction with a faceted navigation interface configured to allow end-users or processing entities to access and navigate within any collection of information.

Figure 1:
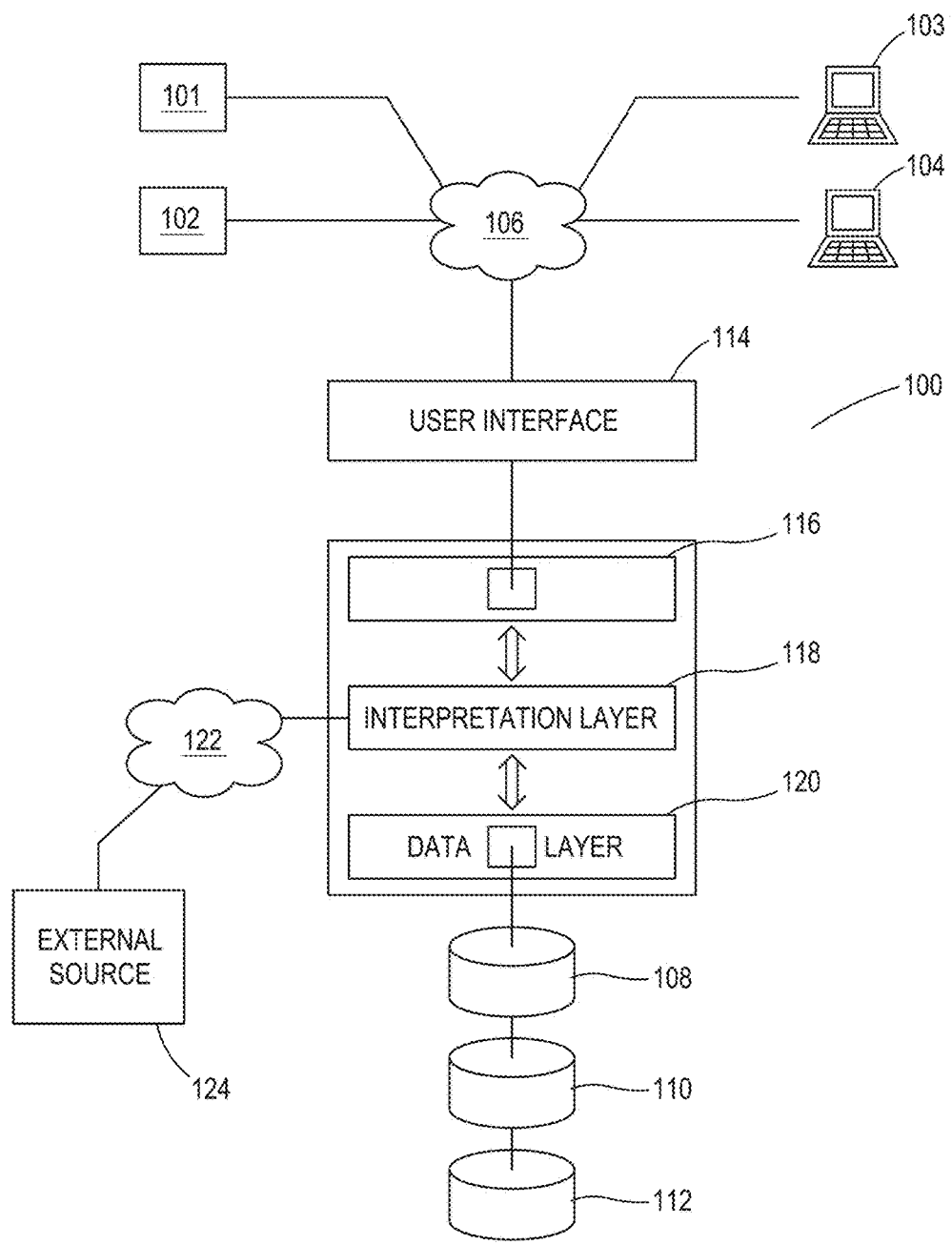
FIG. 1 is a block diagram of an example system architecture according to one embodiment of the present invention.

Shown in FIG. 1 is a block diagram of an example system architecture for an information retrieval system 100. The information retrieval system can be configured to return results from collections of information organized in a variety of formats in response to requests to access the information stored in the collections. Processing entities 101-102 or end-user computer systems 103-104 can access the information retrieval system 100 via network 106 to view results obtained from one or more collections of information (e.g., 108, 110, 112). In some embodiments, processing entities 101-102 can include systems or applications that interact with information stored on the information retrieval system. In one embodiment, the information retrieval system can be configured to enable faceted navigation of the data stored within one or more collections of information 108, 110, 112. Processing entities and/or end-users 101-104 can interact with a user interface 114 that permits selection of facets in the user interface to obtain subsets of the data stored in a collection of information. The user interface 114 can be an element of a faceted navigation component 116.

In one embodiment, the faceted navigation component can be configured to enable navigation with the one or more collections to return sets of results from the collection based on selections of facets entered in the user interface. In some embodiments, the faceted navigation component 116 is configured to enable navigation within the one or more collections of information through an interpretation layer 118. The interpretation layer can include a semantic layer, which includes synthetic data generated, for example, from the one or more collections of information 108-112, discussed in greater detail below.

In some embodiments, the faceted navigation component can be configured to access the interpretation layer in conjunction with or separately from access to a data storage and retrieval layer 120, including one or more collections of information (e.g., 108-112). In some embodiments, interpretation layer 118 can be connected to a communication network 122 and external sources of information can be accessed as part of interpreting synthetic data returned by interpretation layer 118 during access to the one or more collections of information, which may be obtained through, for example, faceted navigation of data.

Faceted Navigation

Figure 2A:
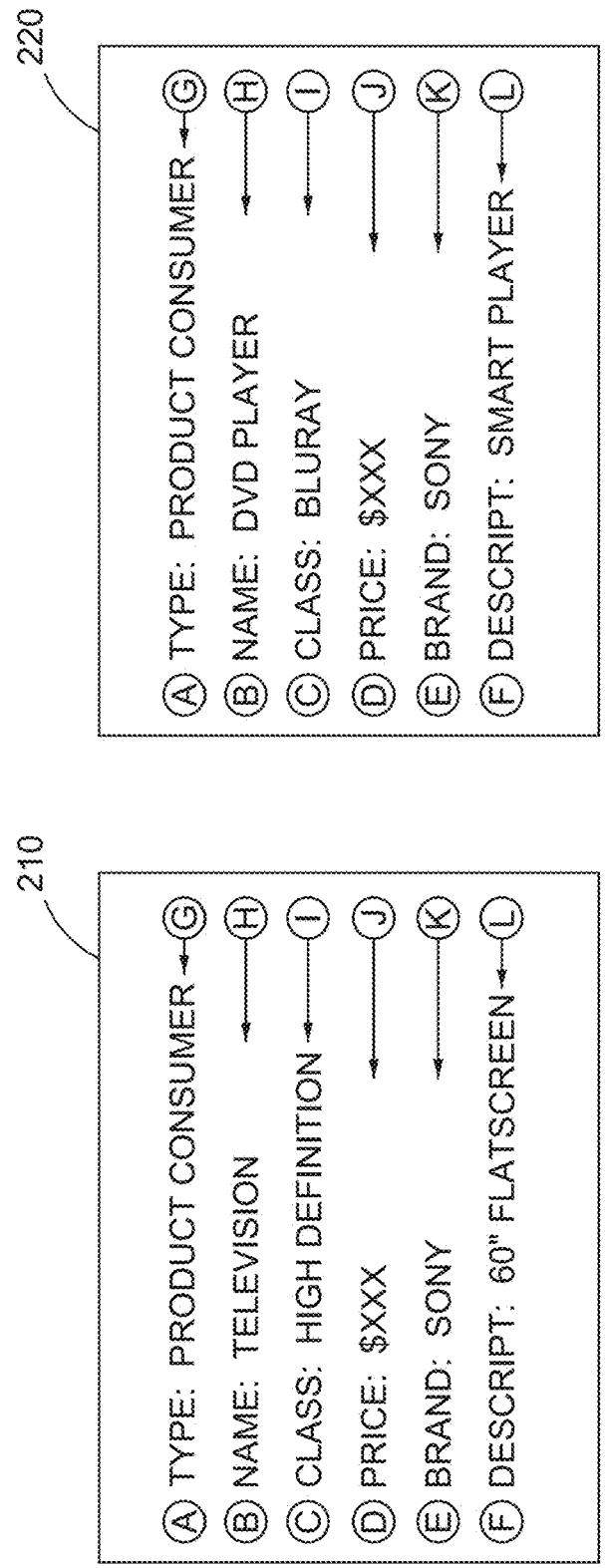
FIG. 2A illustrates example data objects according to one embodiment of the present invention.

According to some embodiments, faceted navigation systems can include data repositories organized based on facets, also known as dimensions, which represent collections of database objects sharing a common relationship or attribute. In one embodiment of a faceted navigation system, the database object attributes are exposed to the end-user for selection in a user interface to facilitate incremental query refinement. Using the example of a customer searching a database of consumer products, individual database objects, shown for example in FIG. 2A, representing products are associated with attributes such as "price", "brand", and "description". For example, a television object 210, and a DVD player object 220 can be stored in a database of objects. In one embodiment, a collection of information can include the database of objects. In another embodiment, a collection of information can include a plurality of databases of objects.

In response to a user query, a faceted navigation component can be configured to provide not only a set of product results which satisfy the query terms (e.g., television object 210 and/or DVD object 220), but also a selection of attributes (e.g., 210A-F and/or 220A-F, and in some examples, values within those attributes—e.g., 210G-L and/or 220G-L) which are considered to be relevant refinements of those results. That is, selection of one such refinement, for example, in the user interface will create a modified operation which will produce results from the database of objects constrained to the specified attribute and values, representing a closer approximation to the user's intent. In one example, selection of a refinement can define a modified query that returns a modified set of results from, for example, the database of objects.

Continuing with the example, a customer search for "High Definition TV" may find several hundred items matching that descriptive criterion. A faceted navigation response might also include a suggestion that including the attribute "brand" 210E in a subsequent query would provide useful refinement, with the particular values "brand=Sony" providing 28 results, "brand=Samsung" providing 17 results, etc. Another refinement suggestion might indicate that prices for the described products range from several hundred to several thousand dollars, with concentrations of results associated with several distinct price ranges. Still other refinement suggestions might indicate that the attributes "size" and "display resolution" are significant.

These suggested refinements can be obtained by evaluation of the set of attributes associated with the query results. In one embodiment, an information retrieval system is configured to automatically generate refinements based on attributes associated with results identified in a collection of information. The system can be configured to focus on those attributes and/or values that are, as examples, not already part of a query and have a defined value for a significant number of the results, to generate refinement candidates. Those refinement candidates can then be subjected to a relevance ranking operation. To provide some examples, the refinement candidates that have a few distinct values, wherein the few distinct values select a significant portion of the results, are considered highly significant, and the refinement candidate that have many distinct values which select either very few or very many results are considered less significant, and those refinement candidates which select the entire result set or produce no results are suppressed.

Additionally, the refinement candidates can include synthetic data (e.g., synthetic/virtual objects, synthetic/virtual data elements, and/or synthetic/virtual group objects, synthetic/virtual data elements) returned by the system, discussed in greater detail below. In some embodiments, the synthetic data, can include a synthetic object can be associated with data results and/or operations on data stored in the database. The synthetic object can be interpreted by the system and the operations associated with the object executed when access to the object is attempted, for example, via just in time processing as part of returning a set of results requested from the information retrieval system. In one embodiment, the information retrieval system can include a interpretation layer for interpreting synthetic data. The interpretation layer can include a semantic layer. The semantic layer can be configured to process, for example, the synthetic data object "profit margin" 240, FIG. 2B. The synthetic data object can be defined and accessed in response to information requests on, for example, recent television sales. An information request can include queries entered into a user interface and/or navigation selections made on data displays, including selections of data attributes. In one embodiment, a database can include transaction objects 230, with product names stored in an item attribute 230B, and including further attributes: date 230C, quantity 230D, price 230E, and customer information 230E.

The synthetic object profit margin 240 can define an operation or operations to be performed on a database, collection of data, external collections, or other objects in the database. For example, profit margin object 240 can calculate for the queried recent sales results: sum all sales to obtain net sales, subtract cost of goods, divide total by net sales, and return the result expressed as a percentage 240C. In some examples, the operation can be defined to be executed on the current set of results being returned, being viewed, and/or being processed. In other examples, the synthetic object can define a set of results on which to operate independent of a current operations being performed.

In one embodiment, when the synthetic object is combined with a database query that selects recently sold products, e.g., high definition televisions, the semantic layer object can effectively augment native database information about a product (cost, price, sales units, etc.) with the new synthetic value "profit margin." In some embodiments, profit margin can be accessed as an attribute of data object 230. In some further embodiments, the system can be configured to recognize, or have defined in the profit margin object, that profit margin is applicable to a group of database objects (e.g., 230) of the type: transaction. Profit margin can be referenced by the system in each of the objects in the matching group, permitting access to the new attribute and associated data value(s) in any of the matching objects. In some embodiments, objects of the matching group can be defined by and/or include a virtual group of objects.

The system can be also configured to introduce synthetic attributes into objects defined by a virtual group. Virtual groups can be defined by membership operations that capture and associate a plurality of data objects. The data object can have a variety of organizations/data structures that enable the system to present interesting and/or efficient aggregations of information from the underlying data records physically stored on the system. The virtual grouping of data objects can likewise be extended with synthetic attributes and associated values. The system can use the synthetic groupings to simplify data access to the actual records. In some embodiments, execution of the synthetic groupings can be executed as the data and/or grouping is accessed. Subsequent access can be optimized by storing interpretation of the execution of the query or navigation operation and/or an interpretation of the execution of any operations defined by the virtual grouping or synthetic data being accessed.

An information retrieval system or a faceted navigation component can be configured to automatically identify the refinement/data augmentation opportunity for presentation. For example, augmentation can occur via presentation of a refinement option in a user interface. In some embodiments, a query on recent sales can trigger interpretive logic in a semantic layer that automatically augments the search results with the new synthetic value named profit margin 240E.

In one embodiment, a navigation selection or entered query can be executed by the information retrieval system against the data associated with the information retrieval system and against an intermediate layer. The intermediate layer can include a semantic layer configured to provide synthetic or virtual data (e.g., synthetic objects, synthetic data attributes, synthetic data values, etc.). The synthetic data can be displayed and accessed as a refinement to a set of results and attributes displayed on a user interface in an information retrieval system.

In some embodiments, the system can be configured to access cached information for the synthetic object to determine whether the synthetic object is associated with few or many results for ranking the synthetic object and its attributes for potential refinement. In some embodiments, the system can be configured to execute any operation(s) associated with the synthetic data to evaluate the synthetic data against other refinement options. In one embodiment, operations performed by or on data can be defined based on a logical data model interpreted, for example, in a semantic layer. In one example, the logical data model can include a faceted data model, although in other embodiments different data models can be employed.

Faceted Navigation Data Model

The logical data model underlying a faceted navigation component can be in various aspects both simpler and more complex than that of an equivalent RDBMS. In one embodiment, all data within a collection supporting a faceted data model are stored as records, where each record can be associated with a number of attributes. In one embodiment, the records/attributes of the faceted data model can be analogous to the rows/columns of a RDBMS table, with several notable exceptions. For example, there are no distinct tables for data described by different schemas; different data types may have different sets of attributes, but are stored in a common repository. In other words, the data is unstructured in the context of a single overarching schema. In some embodiments, each object stored can have its own schema, or organizational structure. Thus, a collection of "self-describing" objects can be described as a heterogeneous collection.

Thus, if this faceted repository were to be described in RDBMS terms, it would be said to have extremely "ragged" rows; that is, appearing to have a large number of columns having a large number of null entries. Further, attributes may also be logically nested, creating attribute hierarchies. By convention, values within an attribute are considered to take on the context of that attribute, effectively becoming locally unique even if not globally unique. As an example, the value "Java" becomes a unique identifier of a programming language within the attribute "Software Language", a colloquial synonym for coffee within the attribute "Beverage", and a geographic locale within the hierarchical attribute "Region: Indonesia".

Navigation and/or query operations may be performed upon a faceted repository. For example, select operations can be configured to create a query response set containing records associated with particular attributes having particular values and the operation(s) can be further configured to identify attributes within those records having values of interest. In another example, filter operations can be configured to optionally refine the query response set by retaining or discarding records further associated with other particular attributes and/or values. Some embodiments implement index structures on attribute sets to expedite search or filtering by attribute and value. Other embodiments can implement additional implicit filtering operations within query processing to, as examples, return particular types of records and maintain access control security.

Some embodiments limit facets to attributes that are readable in a current security context (e.g., private or public designation), and can also describe facets as "navigatible" if they are associated with index structures which support fast and efficient search and/or filtering operations. Navigatible dimensions or facets facilitate guided navigation within collection(s) of information. In some embodiments, guided navigation includes a method of incremental and/or interactive refinement of, for example, a result set. Synthetic objects, synthetic facets, and synthetic data can also be accessed by the system to present navigatible dimensions or facets that facilitate guided navigation within collection(s) of information.

In some embodiments, a faceted data navigation model can include synthetic data (e.g., synthetic objects, synthetic facets, and/or synthetic data elements). In some embodiments, a faceted data navigation model can include synthetic native data organized as entities. The entities can be operated on, executed, and/or interpreted in an interpretation layer to provide access to the synthetic data and native as selectable facets and objects in a guided navigation interface. In one example, the synthetic objects, facet, and/or data can be presented for selection within a user interface to return sets of results from a collection of information. Further, in some embodiments, synthetic data can be the object of query operations executed on the system.

In some embodiments, the logical data model can include, for example, a semantic layer including synthetic data elements. The semantic layer can be presented by the system as an intermediate layer between end-users and any stored data in a collection of information. Queries and or navigation operations executed against any collection of information can also be interpreted in the semantic layer to provide additional and/or augmented data results.

Figure 3:
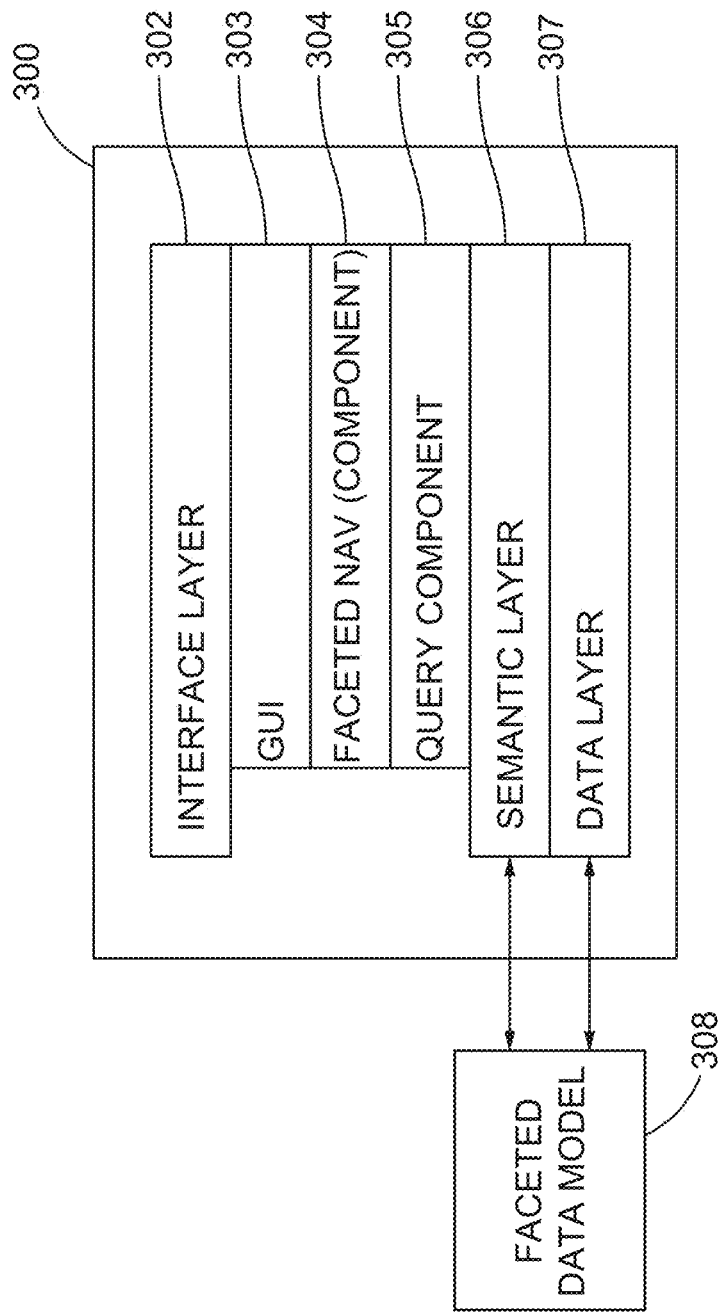
FIG. 3 is a block diagram of an example system architecture according to some embodiments of the present invention.
Figure 4:
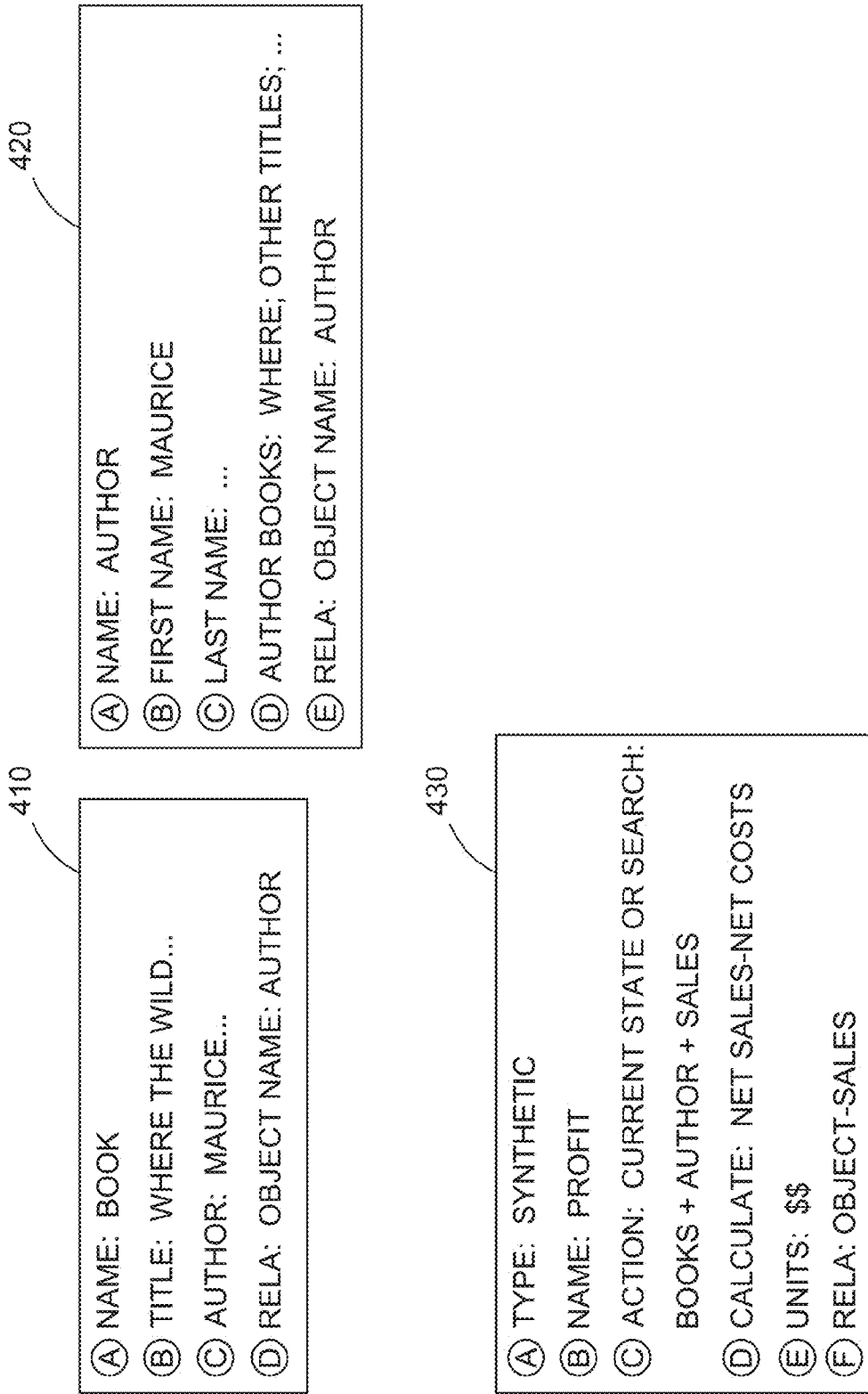
FIG. 4 illustrates example data objects including synthetic data according to one embodiment of the present invention.

FIG. 3 shows a block diagram of an example system 300 for accessing data organized on a faceted data model, according to one embodiment. System 300 includes an interface layer 302 for receiving and processing information requests. Interface layer 302 can include a user interface component 303, configured to generate a graphical user interface with which other systems/users can interact. Interface layer 302 can include a faceted navigation component 304 and/or a query component 305 for processing information requests to capture data stored on the system. The interface layer 302 can communicate with data layer 307 directly and/or communicate with data 307 indirectly through semantic layer 306. Both the data layer 307 and semantic layer 306 can be configured to access data stored in one or more collections of information. The data stored in the one or more collections of information can include data organized by a faceted data model 308, including, for example, data stored as objects associated with attributes that define or characterize the objects. The attributes or sets of attributes can be organized into facets and the facets can be the subject or object of information requests received by an information retrieval system.

Faceted Navigation of Objects with Complex Relationships

In some embodiments, faceted navigation components support more complex facet models including dimensional hierarchy and many-to-many object relationships, where an object's membership in a facet can be based on indirect associations. As a real-world example of a complex search and navigation problem: searches within a physical library collection to retrieve a biography of a popular novelist presents a number of faceted navigation issues—the subject of the desired book is an author who writes popular novels.

The library card catalog indexes "books by subject" and "books by author," but does not provide direct query support for the implied indirect associations. Thus, a conventional solution to the problem may be found by integrating the results of a number of more primitive searches: creating a card subset identifying only novels (via searching the card catalog by subject,) narrowing that subset to popular titles (augmenting those results with circulation information,) and finding the authors of those novels (recording the author information from each card in the resulting card subset); separately, creating a second card subset of biographies (searching the card catalog by subject,) finding the subjects of those biographies (recording biographical subject information from each card in the second subset;) and finally, finding individuals who have both written popular novels and are the subject of a biography (merging the list of book authors with the list of biography subjects.) A conventional RDBMS system might process such a search as a SQL join operation between selected elements of the table "books" and of the related table "authors."

Faceted navigation systems that do not support record relationships might emulate this functionality by "denormalizing" their database content—that is, including all author information within the record for each book, potentially to the level of the author's chosen writing genre, book titles, and sales volume. In such an embodiment, the RDBMS join operation would be replaced by a complex filtering operation, finding a book in genre "Biography" with a subject who is a writer in the genre "Novel", who had written at least one book title with high sales volume. Unfortunately, these approaches greatly increase the number and complexity of the data elements needing to be stored in a database or collection of information, and further fail to handle real-world situations such as books authored by multiple authors, authors writing in multiple genres, or "best selling" authors in the sense of having written many books having modest sales rather than one "blockbuster" title. These conventional approaches break-down as the number and complexity of the data elements is forced to grow to provide for all the possible combinations sought by information access requests. In some scenarios the data required can grow exponentially to attempt to accommodate such multiple facet relationships.

An embodiment of an information retrieval system that supports faceted navigation can enable joining of heterogeneous object types, having a variety of data organizations that overcome these issues. In some embodiments, faceted data models can be implemented to include membership in a facet based on indirect associations, and in further embodiments, indirect associations can be made to synthetic data (virtual data objects, virtual data elements, and virtual groups, etc.) to provide access to rich context information provided by data objects having different facets, and/or data types of different structures or organizations.

In some embodiments, maintaining objects as distinct records preserves the context information desired, and connections established by relationships within a single data set can resolve the complex interrelationships. In one embodiment, there are objects that represent books (e.g., object 410, with example attributes: name: book at 410A, title: Where The Wild Things . . . at 410B, author: Maurice . . . at 410C) which, in some examples, can have book-like properties such as title, publication date, and format. These book objects also have a relational association (e.g., at 410D) with other objects within the same data set which represent authors, with those author objects (e.g., object 420 with example attributes: name: book at 420A, firstname: Maurice, lastname: XXXXX at 420C, and authored_books: Where The Wild . . . , and other titles at 420D) having their own distinct properties such as first name, last name, birth date, and country, as well as a relational association to objects representing the books they authored or co-authored (e.g., 420E, Rela: Object Name: Author). Such embodiments support both simple faceted refinement through "books" to "authors", and "authors" to "books", as well as more complex refinements where multiple related object dimensions are simultaneously refined.

Further, the need for additional relationships, refinements options, and even additional data objects, data attributes, and data values can be accomplish through generation of synthetic data. In some embodiments, the synthetic data can also be referenced by and/or include indirect relationships to other objects, as well as define, indirectly, additional subsets of objects from a collection of information. For example, profit per book can be displayed as a synthetic data attribute of both the book object 410 and the author object 420. In another embodiment, a profit object (e.g., 430), can also be accessed as a data object in the same name space as, for example, objects 410 and 420. The profit per book object 430 can include, for example, attributes for type: synthetic defining the type of object at 430A, name: Profit at 430B, action: execute operation on cost/price/sales units/date range at 430C, calculate: average of net sales less net costs at 430D defining the operation and/or calculation to be performed upon access to the object, units: $ returned by the calculation at 430E, Rela: Object-Sales at 430F establishing at least one link to other data objects by which to resolve any additional data necessary to complete the calculation defined at 430D, including for example, sales numbers, cost per book, and/or date ranges.

The same operation defined in the synthetic object can generate different results based on the context in which the synthetic object was accessed. In particular, starting from the context of a search for a book object (e.g., 410) a refinement option that includes sales information, and in particular profit per book, provides an average profit per the book identified (e.g., 410). Accessed from the context of the author, the synthetic object can return an average profit per book based on all the author's books. In some embodiments, the system can offer refinements based, for example, on relationship attributes from the author that lead to profit per book for each book written by the author. In other embodiments, a synthetic data object can provide information designed to capture such complex data-interrelationships as best performing books. In one embodiment, a best performing books virtual object can be configured to aggregate sales of books from multiple data sources based, for example, on relationships identification, virtual groups of objects and object attributes that identify the data sources on which the dynamic determination of best performing can be generated.

According to various aspects, an information retrieval system can be configured to augment, modify, and/or create new data elements, new data objects, and new data groupings by synthesis from existing data objects. The synthetic objects and/or data can be presented by a faceted navigation component (e.g., FIG. 1, 116) as navigatible selections to refine, generalize, or shift a current navigation state within a collection of information.

Discussed herein as refinements, refinement refers to operations performed by the system on data sets returned that are responsive to a query, a navigation operations, selection within an interface, etc. Refinements can be configured to alter, modify, and/or change data prior to presentation, for example, to a user. The alterations to the data set can include filtering, sorting, and/or aggregating the data set being presented. In some embodiments, the alterations can include transitions away from the data set returned to new data sets, that are determined to be responsive to an information request, the new data set can include an expansion of the currently considered data set or generalization. In another example, the set of data can be transitions to a new set of data outside of the current set, sometimes referred to as lateralization. Any type of refinement can be presented by an information retrieval system to facilitate faceted navigation within one or more collections of information.

In some embodiments, an information retrieval system interprets data access requests using an intermediate semantic data access layer. The intermediate access layer can include synthetic data, for example, synthetic objects. The system can be configured to execute selections and/or queries for data against the intermediate data access layer. In some embodiments, the information retrieval system is configured to execute data requests against a "semantic database access layer" as well as against the underlying data stored in the collection. The semantic database access layer can comprise an interpreted layer for improving access to underlying data, improving organization and aggregation of the underlying data, generating refinements to present with data results, among other examples.

Example Semantic Access Layer Properties

As discussed, various embodiments support the creation of synthetic or virtual objects within a database access module, producing a "semantic layer." In one embodiment, virtual objects are generated with object names. The named virtual objects can be presented by an information retrieval system within the same name space as any database objects stored in the collection(s) of information. In some embodiments, these virtual objects do not directly represent physical database records, however, the virtual objects define data objects that can also be accessed by name, at the same time, in conjunction with, and/or processed after objects stored directly in the database. In some embodiments, named virtual objects provide various forms of translation between an external view of the collection of information made available by the information retrieval system, for example, as seen by users and application programs, and the set of records maintained within the database itself.

In another example, a semantic layer can include a synthetic data object "profit margin" 240 FIG. 2B, which may define an operation: net sales less cost of goods, divided by net sales, with the result expressed as a percentage. Synthetic data objects, virtual data objects, and semantic objects are used synonymously to refer to data objects interpreted in an interpretation layer to access or process data stored in collection(s) of information. In one embodiment, when the semantic layer object profit margin is accessed in response to a database query that selects recently sold products, the semantic layer object can be configured to augment native database information about a product (cost, price, sales units, etc.) with a new synthetic value "profit margin." The augmented results may then be utilized, for example, by a report generation application that tracks profit margins of various products over time.

In another example, a database may contain records/objects representing sales transactions, with attributes including items sold, prices, quantities, a customer identifier, date, etc. Given this physical data set, semantic layer objects may be defined which represent "customers" and "products." Extracting customers from the stored transactions described includes a query filtering operation, but also requires de-duplication (as a given customer may make several purchases within any given time period), and result augmentation from other records (as the transaction records themselves have no information about customers other than a relational link). Additional semantic objects may also be defined which represent aggregate or calculated values for these objects, such as "total spend" for a customer, and "average sale price" for a product.

In one embodiment, the computational component of semantic layer objects is obtained by association of programming language statements with the virtual object. In one example, the programming language statements can be stored as values of an attribute associated with the virtual object. In some embodiments, the programming language statements can be executed when the virtual object is accessed. In one embodiment, virtual objects store programming language statements within object attributes, and the information retrieval system and/or semantic layer processes such statements using an interpreter or run-time compiler.

Another embodiment of an information retrieval system and/or semantic layer is configured to store programming language statements within synthetic objects as pre-compiled executable code or as partially-compiled code for subsequent interpretation or runtime execution. In some embodiments, execution of programming language statements stored within object attributes can be associated with the executable code generated by, for example, a run-time compiler. Subsequent access to the object and programming language statements can execute against the now compiled and/or partially compiled code. In some embodiments, the programming language statements stored as attributes can be replaced by pre-compiled code, pre-compiled statements, partially compiled code, etc.

In some embodiments, the information retrieval system and/or semantic layer can be configured with a cache memory to retain runtime compiler and/or interpreter output for possible later re-execution. In one embodiment, the code associated with virtual object programming language statements can be compiled with runtime compiler and/or interpreter output generated for navigation and/or query operations and the combined code cached for subsequent access.

In another embodiment, an information retrieval system includes a just in time processing component configured to integrate processing of semantic layer object programming language statements with query planning and processing. Query planning and processing can include, for example, run time evaluation of the executable actions required to perform the query, interpret virtual objects, aggregate the data, etc. In some examples, the run time evaluation can include re-arranging actions/operations based on distributive and/or associative properties within the executable operations identified. For example, the processing component can parse query, navigation, virtual data interpretation (e.g., programming language statement execution) into the executable pieces required to complete the operation. The operations associated with each of executable pieces can be evaluated to optimize execution of the entire operations. In some embodiments, the compiled and/or partially compiled code can be cached to improve subsequent execution.

Semantic interpretation of the data set can also include processing of the data set and any data objects and data attributes for access permissions. The semantic layer can be configured to process information access requests, where subsets of the data is accessible only in the semantic layer for processing/interpretation purposes, but not viewable as a result returned by an information retrieval system. Data sets accessed by the semantic layer may also be interpreted as being comprised of objects having both private and public attributes. Rather than viewing the data in a collection as a set of discrete records, the data set within any collection may also be interpreted as being comprised of objects and attributes each having both private and public attributes. The objects can be returned by an information retrieval system in response to data access requests.

In one embodiment, the semantic layer can support interaction with data as objects (virtual and directly stored data) having complex interrelationships. The semantic layer can be configured to support private and public designations/attributes for synthetic data as well as data stored directly in the one or more collections of information. Public attributes are those attributes that are directly accessible by the information retrieval for display to end-users and/or requesting entities, while private attributes can be reserved and/or blocked based on contextual or authorization-based security. Further private attributes can be used by the system in creating the semantic layer.

In some embodiments, the objects returned from collections of information can be interpreted against access restrictions, and/or interpretation of information access requests can occur in order to return data objects as results. The interpretation can occur in, for example, a semantic processing layer, that executes operations associated with synthetic data and/or matches data results against synthetic data for further processing. In one embodiment, an information retrieval system can be configured to process returned data prior to presentation to a requestor based on the designation of the object and/or attribute as public or private resources.

In one example of such an object-oriented model, the public attributes are those which are directly accessible in response to, for example, information access requests by a database user. In one example, the public attributes can be returned directly as part of the result set for a database query. Private attributes, in contrast, are those not directly accessible at a given time. In some embodiments, private attributes can be reserved for internal database use (e.g., processing in an information access layer), blocked by a contextual or authorization-based security model, or intended for consumption by an intermediate software layer (e.g., the semantic layer) before presentation to the user.

According to some aspects, synthetic data can also include virtual groups and/or grouping of data objects and object attributes interpreted by the semantic access layer. Virtual group objects can include programming language statements, for example, that define membership within a virtual group. The programming language statement can be executed, for example, by the semantic access layer upon access to the virtual group. Access to the virtual group can trigger just-in-time processing by the semantic access layer, as discussed above. The programming language statements for the virtual group objects can be stored as attributes of the virtual group objects and compiled, as discussed above.

Semantic Layer Grouping

Synthetic grouping objects may also be created, for example, by a user within the semantic layer. An information retrieval system can be configured to create virtual sets of objects for which group membership is determined by runtime evaluation by software within the semantic layer. Runtime evaluation can include the execution of programming language statements that are configured to dynamically determine membership within the group, rather than determining associations through sharing of a common attribute or attribute value. Further, programming language statements can be configured to access and/or group data from external data sources to include as a member(s) in a virtual group.

In one example a virtual group object can define a set of "preferred customers" through stored programming language statements and/or compiled code. Continuing this example, preferred customers might be defined as those customers above the 80th percentile of customer spending over the previous 90 days, as evaluated at query time. The data attributes necessary and the operations on the data stored in those attributes can be defined by the virtual group object. In one example, customer attributes are selected from a plurality of different data objects native to a collection, including identification information for a customer in one object, sales transactions in another object, profit per sale defined in another virtual object, an operation defining aggregation operations for the sales transactions over time, a ranking operations on the customers, which can be based not only spending but on the value derived by the spend through the virtual object profit per sale, who meet a current context of the previous 90 days as determined at query execution time. This dynamically determined group of customer can be determined upon access to the virtual group "preferred customers."

In some embodiments, some attributes of the virtual group object can be defined in relation to a current state. For example, current state can include the context of any navigation operations and/or queries executed by an information retrieval system prior to accessing the virtual group object. In one example, the information retrieval system can have generated data results from a collection of information, first on sales data, then on sales data third quarter, then aggregate sales by customer for third quarter—triggering the information retrieval system to process the virtual group object "preferred customers" as a potential refinement selection in, for example, a faceted navigation interface. The data range for the virtual group object can be established to identify the time interval "third quarter", for example, based on the current state of the data being reviewed on the information retrieval system. A parameterized value in an operation defined for the virtual group can be configured to resolve, for example, data range based on a current data state or in another example a timing of the access to the virtual group.

In some embodiments synthetic grouping objects can also define attribute groups. For example, a virtual group object can be an entity stored on an information retrieval system. The information retrieval system and/or a semantic processing layer can process the entity to capture attributes from data objects stored in, for example, a database. The stored entity enables the information retrieval system to access/specify a subset of the attributes stored in the system on the database as a named group. In some embodiments, the named group can be accessed in the same namespace defined, for example, by named objects stored in the database and named virtual objects interpreted by the semantic access layer. The named group can comprised various components and/or attributes of the native data objects, generating new synthetic data that can be retrieved, queried, and/or operated on even though the data is not physically stored in the collection.

In some embodiments, these groups can be a specific list of fields, or a description of the characteristics of fields defined by combination of filters, range filters, and computational language statements. In one example, the collection of the specific list of fields, or the description of the characteristics of fields defined by combination of filters, range filters, and computational language statements can be stored as an entity accessible by the semantic layer just as any other data or data object stored directly in a collection. In another embodiment, entity definition can include virtual and native data, referenced by the collection of the specific list of fields, or the description of the characteristics of fields defined by any combination of filters, range filters, and computational language statements.

In some examples, descriptions of the characteristics of the fields enables the information retrieval system to interpret virtual group objects against data having a variety of formats, and in addition, against new data sources having new formats with relevant attributes and/or data without additional configuration of the virtual group object. In some embodiments, other synthetic data can also be interpreted by the information retrieval system against new data sources having organization formats without additional configuration of the synthetic data.

In some examples, attribute groups can be configured through a user interface presented to a user. The interface can be configured to permit a user to select default attributes to include in the virtual group object, and further can include selectable descriptions of the characteristics of fields to define/include in a virtual group object. In one example, the interface can be configured to present filter operations for selection, including selections for range filters, programming language statements, and/or computational language statements. In further embodiments, a user can define their own programming language statement for input into the system. In some embodiments, the information retrieval system can include validity checking for any defined virtual object and/or virtual group objects.

In some embodiments, named attribute groups can be configured to include designation of default attributes to be used in guiding user navigation during interaction with one or more collections of information accessible by a information retrieval system. In some embodiments, the virtual group objects can be configured to present selectable views of the collection(s) of information. For example, a faceted navigation component can be configured to interpret virtual group objects to define a data access view to present to a user in a user interface. The data access view can be generated based on entities defined on the system. The entities can be interpreted by a semantic layer to refine and/or filter data viewable in response to information access requests.

In one embodiment, virtual group objects present an entity-centric view that can be configured to facilitate user interaction with a collection of information. Based, for example, on access rights for a given user, virtual group objects can be defined that eliminate various portions of a database from a user's view of the data. In some embodiments, the view can be enforced at the semantic access layer when responses are generated for presentation to the user. For example, information access requests in the form of navigation operations and/or query statements can still be executed against an entire collection to take advantage of relationship information, other virtual objects, etc., but prior to presenting the results, the semantic access layer is configured to filter the results to only the data within the entity defined view.

In other embodiments, default options can be associated with virtual groups objects to provide for an entity-centric view. The virtual group defined by a virtual group object can be associated with a token to permit definition of a default list of options for the virtual group object based on selection of the token. In one embodiment, the default list of options can be stored on a information retrieval system. In another embodiment, default list of options can be automatically generated by the information retrieval system based on analysis of the properties of the virtual group. Automatic analysis can be configured to establish and/or access predefined lists of options and/or operations that can be associated with a virtual group object. In some settings, the token can be used by the system to associate operations, attributes, etc. to a virtual group based on selections made during virtual group object generation. For example, a user generating a virtual group object can be presented with the predefined lists of options and/or operations in a user interface. By selecting and/or deselecting within the user interface the user can generate new virtual group objects.

Example Processing

Figure 5:
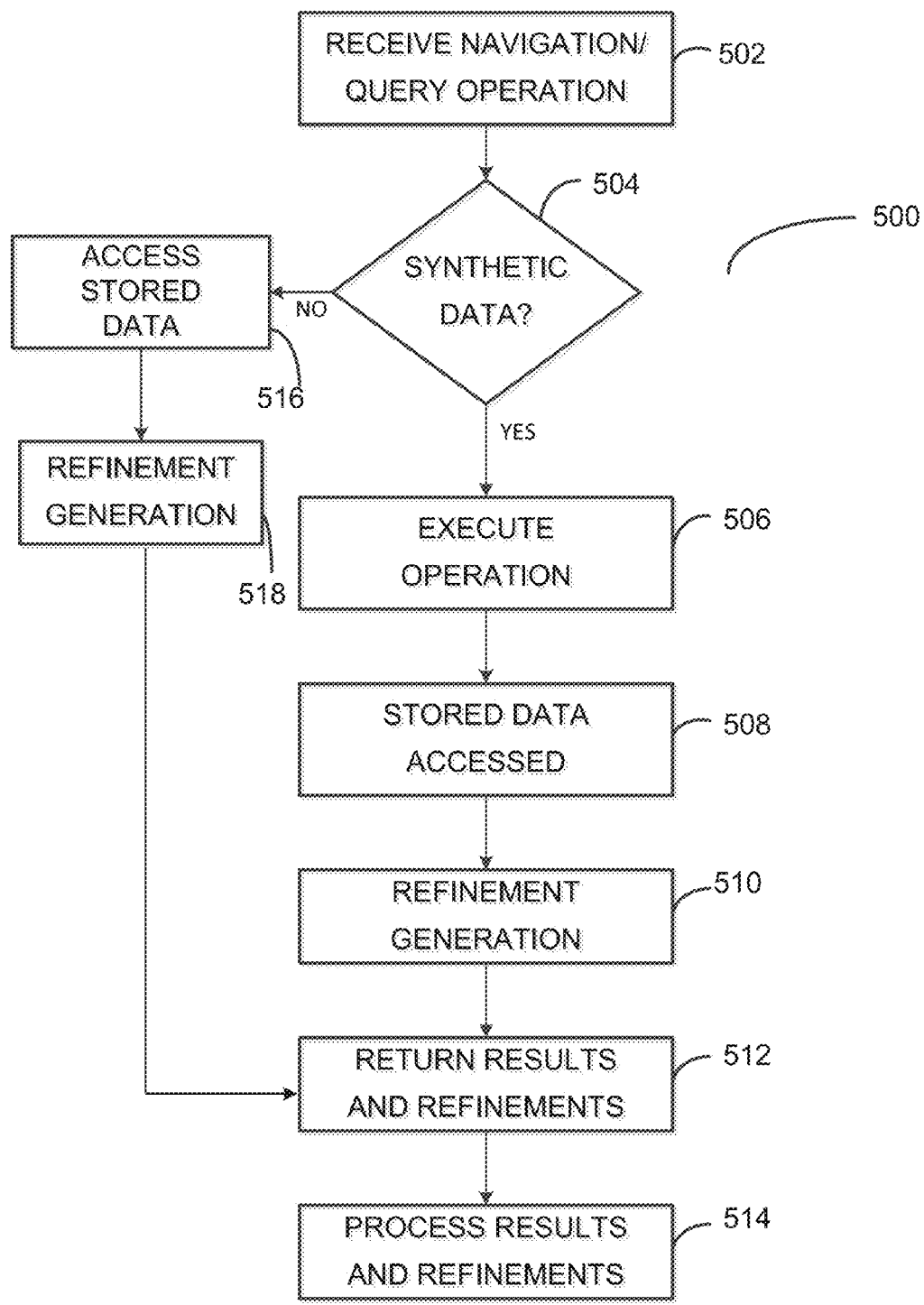
FIG. 5 illustrates an example process for accessing a collection of information to generate results according to one embodiment of the present invention.

Shown in FIG. 5, is an example process 500 for preparing a set of results from one or more collections of information configured for faceted navigation. Process 500 begins at 502, wherein a navigation operation and/or query is received. The navigation operation can include selection of any one or more of a facet, attribute, and dimension in a user interface displayed to user. The selection of the facet can trigger operations on data stored in a collection of information. In one example, selection of any one or more of a facet, attribute, and dimension is configured to permit a system to generate a subset of the data available in a collection of information and, for example, return the subset of data as a result.

Determination of the subset of materials from the collection of information can require interpretation of synthetic data available on a system. For example, process 500 can proceed at 504, where it is determined whether or not a current navigation and/or query operations needs to be resolved against synthetic data (e.g., a virtual object, virtual data, virtual data element, virtual group object, etc.). At 504 NO, no access to synthetic data is required. At 504 YES, synthetic data needs to be interpreted to retrieve responsive data to the request from 502.

For example, virtual group objects can define a view of a collection of information. In one embodiment, all data requested received at 502 must be processed against the virtual group objects that define the entity based view. In one example, the virtual group objects define subsets of data stored in a collection of information that may be accessed by a user. Any operation(s) defined by the virtual group object can be executed at 506. The execution of the operations defined by virtual group objects can be executed based on programming language statements stored as attribute values in the virtual group objects. In some embodiments, the virtual group objects can be associated with compiled and/or partially compiled operations to optimize the generation of, for example, the entity centric view of the subset of data.

In another example, virtual objects can be identified based on the received navigation and/or query operation at 502. Virtual objects can define operations on the data stored in the collection. The operations can be executed at 506 to generate subsets of the data, mathematical operations on the subsets or data, aggregations of the data, among other examples. In some examples, the operation executed at 506 generates facets and/or data attributes for inclusion in a set of data results obtained from the collection of information. In some embodiments, the operations executed at 506 can be configured to synthesize data objects, elements, and/or facets from any associated collection or collections of information, including external information sources to be included in a set of data results obtained from the collection of information.

The synthetic data can be an element or the object of query, and be identified at 504 YES on that basis. The data generated by the synthetic objects can be determined at 506, for example, in conjunction with execution of a query on the collection of information.

The data stored in the collection of information is accessed at 508, for example, through a data access layer, to capture any information responsive to the navigation and/or query operation received at 502 that is stored in the collection. The data stored in the collection of information can also be accessed at 506, responsive to the execution of any operation associated with a semantic layer object (e.g., virtual object, virtual group object, entity including any of the forgoing, etc.). The result of the execution of the operation(s) at 506 and the access to the data layer at 508 can be reviewed to determine if the responsive data implicates any further semantic layer interpretation at 510.

In one embodiment, the results from 506 and 508 are analyzed to determine if additional information should be provided in conjunction with the results at 510. For example, analysis can include refinement generation for presentation with a returned set of results. In one embodiment, a navigation selection may be made on an attribute displayed in a user interface—"High Definition TV"—and results generated from the collection of information against "High Definition TV" can include several hundred items matching that descriptive criterion. A faceted navigation response can be configured to include a suggestion that the attribute "brand" would provide useful refinement, including as examples, the particular values "brand=Sony" and an identification of the number of results, "brand=Samsung" and an identification of the number of results, etc.

Another refinement suggestion might indicate that prices for the described products range from several hundred to several thousand dollars, with concentrations of results associated with several distinct price ranges. Still other refinement suggestions might indicate that the attributes "size" and "display resolution" are significant. In other examples, refinement selections can include synthetic/virtual attributes derived from data within the collection. In one example, "customer satisfaction" can be identified by the system as a potential refinement for results generated from the collection of information against "High Definition TV." In one embodiment, customer satisfaction is not a data value stored directly in the collection but rather a virtual data element derived from operations performed on the collection.

At 510, refinements can be identified. Identification of refinements can include determination of additional data attributes to include with the set of result. In one embodiment, the identification of refinement can include information of the results that would be returned if the refinement is selected. In another embodiment, refinements determined at 510 require interpretation of synthetic data. For example, a virtual data attribute may not be stored directly in the collection of information, but still be accessible by executing operations defined by the virtual object having that attribute or operations defined for determining the attribute and any associated values. Virtual objects, virtual data, and/or virtual groups and any operations defined for them can be executed at 510 to determine refinements to present with any results from 506-508. The results and any refinements determined at 510 are returned at 512.

In some embodiments, the results and any refinements returned at 512 can undergo further processing. As discussed, in some embodiments data views can be enforced. The returned results and any refinements can be processed at 514, for example, to insure that the data views are respected. In one example, data objects and/or attributes can include public/private designations that are used to filter the set of results and any refinements at 514.

If no interpretation of synthetic data is required, 504 NO, process 500 continues at 516, and the navigation and/or query operation received at 502 is resolve against the data stored in the collection at 516. The responsive data can be evaluated to determine refinements at 518. The determination of refinements at 518 can require access and/or interpretation of synthetic data. For example, virtual objects can be identified as potential refinements for a set of results identified at 516. At 518, any operations defined by the virtual objects can be executed to determine whether the virtual object should be presented as a refinement.

In one embodiment, suggested refinements can be determined at 518 based on, for example, evaluation of the set of attributes associated with the results from 516. In one example, evaluation of the results and/or attributes can be configured to focus on those attributes and/or values that are not already part of the navigation and/or query operation and that have a defined value for a significant number of the results to generate refinement candidates. The refinement candidates can then be subjected to a relevance ranking operation.

In one embodiment, refinement candidates having a few distinct values, each of which selects a significant portion of the results, are considered highly significant, and ranked highly for presentation. Those having many distinct values which select either very few or very many results are considered less significant, and those which select the entire result set or produce no results are suppressed. In some embodiments, virtual objects, virtual data, and/or virtual group objects can be associated with cached data, which can be accessed for determining ranking as a possible refinement, rather than requiring execution of the operations stored in the virtual objects, virtual data, and/or virtual group objects. Once the set of data has been identified 516 and possible refinements established 518 the data and refinements, process 500 can continue at 512, as discussed above. Results and refinements can be returned at 512 and then the returned results and any refinements can be processed at 514, for example, to insure that the data views are respected. In one example, data objects and/or attributes can include public/private designations that are used to filter the set of results and any refinements at 514.

In some embodiments, processing can occur in a semantic access layer prior to execution of process 500. In one embodiment, virtual group objects can constrain the data accessed by, for example, a user based on permissions, security privileges, public/private designations for data objects and/or attributes. In another embodiment, the virtual group objects can be resolved by the semantic access layer to define a subset of the collection of information that can be accessed by a user's information access requests. The subset of the collection of information can define the view of the data for that particular user.

In some embodiments, results and/or refinement can be generated prior to resolving view restrictions, security restrictions, and/or public private designations on returned data. In one embodiment, the semantic layer can support interaction with data as objects (virtual and directly stored data) having complex interrelationships, rather than viewing the data as sets of discrete records. The semantic layer can be configured to support private and public designations for synthetic data as well as any data or data attribute stored directly in the one or more collections of information. Public attributes are those attributes that are directly accessible by the information retrieval for display to end-users and/or requesting entities, while private attributes can be reserved and/or blocked based on contextual or authorization-based security. Further private attributes can be used by the system in creating the semantic layer. In one example, the private attribute can designate data, data collections, data operations, etc. that are for processing only in the semantic layer. Prior to returning results private data can be filtered.

Once results and/or refinements are generated further processing can be executed to resolve any view restrictions, security restrictions, and/or public private designations on the returned data, for example, by the semantic access layer.

Figure 6:
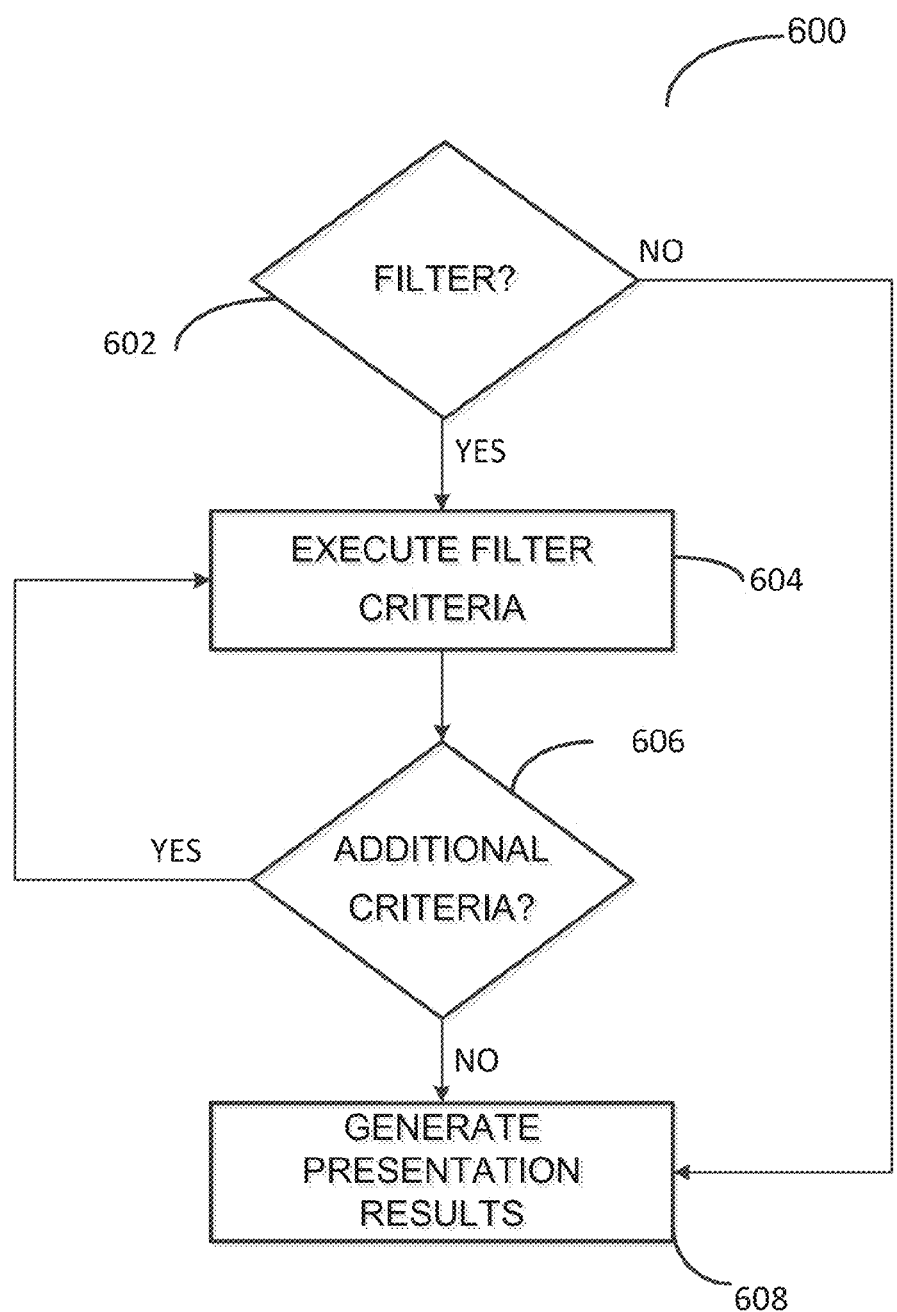
FIG. 6 illustrates an example process for generating results and refinements for presentation according to one embodiment of the present invention.

FIG. 6 illustrates an example process 600 for generating results and refinements for presentation. For example, a set of results returned by navigation selections can be processed to determine if any filter operations are required prior to generating a display of the results and any refinements at 602. In another example, query operations executed against a collection of information can generate one or more sets of results from the collection. The one or more sets of results can be processed to determine if any filter operations are required prior to generating a display of the results at 602. In some embodiments, sets of results can include refinements generated to assist a user in interacting with the returned information. In other embodiments, the sets of results can include results generated by interpretations of synthetic data (e.g., virtual objects, virtual data, virtual data elements, virtual data attributes, virtual group objects, etc.).

Prior to presentation of the one or more sets of results to, for example, a user, the results can be processed to resolve any viewing restriction information at 602. Viewing restriction information can designate security privileges, data permissions, access rights, processing limitation, etc. In one example, viewing restriction information can be associated with results responsive to navigation and/or query operations performed on a collection of information. In one example, results returned from a collection of information include public/private designations and filtering is required 602 YES. Viewing restriction information can include, in one example, public/private designations on data objects, data attributes, data elements, etc. In some embodiments, the public/private designations can be defined on objects (e.g., virtual objects and objects actually stored in the collection), and also can be defined on attributes associated with the objects stored or virtual. At 604, public/private designations are checked and any information, attribute, and/or object marked private can be filtered, prior to presentation of the results and any refinements.

Filtering can be performed on data objects returned as well as refinements generated for the data objects, for example, at 604. In some embodiments, additional filter criteria can be identified at 606 YES. For example, viewing restriction information can include security privileges that prevent a user from viewing a data object. In another example, access rights can be defined for a data object, data attribute, synthetic data object, synthetic data attribute, synthetic data element, etc. If the user does not have the appropriate access rights, the portion of the results can be filtered, for example, at 604. If additional filter requirements are identified, the associated filtering operations are executed at 604.

For example, virtual group objects can define operations that constrain a returned set of results and any refinements. The operations stored in the virtual group objects can be executed at 604 to filter the results and any refinements. If no additional criteria is identified 606 NO, and if no filtering is required 602 NO then a presentation of the results and any refinements, for example, in a user interface display is generated at 608. Process 600 can be invoked by other processes, for example, to resolve data filter criteria including public/private designations. In some embodiments, process 600 can be invoked by other processes to insure view consistency and/or to enforce view constraints defined on an information retrieval system. In one example, process 600 can be executed by other processes that generate results from one or more collections of information, including for example, process 500 at step 514.

Figure 7:
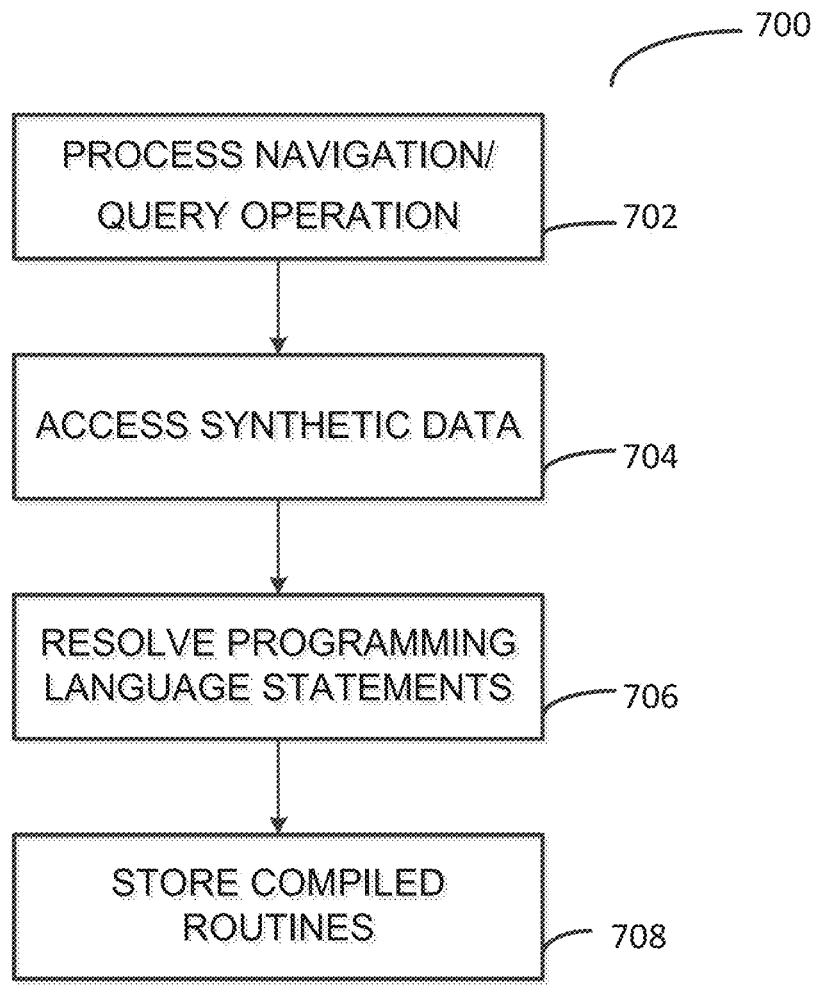
FIG. 7 illustrates an example process for resolving synthetic data according to one embodiment of the present invention.

According to one embodiment, faceted navigation can include processing information access requests against one or more collections of information that include synthetic data (e.g., virtual objects, virtual data elements, virtual data attributes, and virtual group objects). Shown in FIG. 7 is an example process 700 for resolving synthetic data. Process 700 begins at 702 with the identification of synthetic data. Synthetic data can be identified responsive to navigation selections in a user interface, query terms executed against a collection of information, as some examples. Synthetic data can also be identified based on indirect references to data being accessed, including for example, relationship information stored as an attribute of a data object stored in a collection. In some other examples, synthetic data can also be identified as candidate refinement options are evaluated and/or determined. In some further examples, synthetic data can be identified at 702 and then accessed at 704 responsive to any information access operations, for example, based on data view definitions in an interpretation layer. In some additional examples, synthetic data elements and/or attributes can be identified by references within accessed data.

Once synthetic data is identified at 702, the synthetic data can be accessed at 704 to determine any operations, actions, data aggregations, filtering operations, etc., that are associated with the synthetic data identified. In some embodiments, synthetic data can include virtual data objects, virtual data elements, virtual data attributes, and virtual group objects, which define operations interpreted against data stored in a collection. In one embodiment, the operations are stored as programming language statements in attributes of the synthetic data. For example, a virtual object can be defined with attributes and/or facets based on data stored in a collection of information under a faceted data model. At least one attribute can include programming language statements to be interpreted and/or executed at 706. In one example, a run time compiler can be configured to interpret the programming language statements and optimize the programming language statements at 706. In one embodiment, the run time compiler can be configured to interpret the programming language statements, and optimize other data access execution in conjunction with execution of the programming language statements. For example, query execution can be combined and/or optimized in conjunction with execution of programming language statements at 706. In one embodiment, programming language statements can be combined with, for example, query planning and processing. Query planning and processing can include run time evaluation of the executable actions required to perform the query, interpret virtual objects, aggregate the data, interpret synthetic data, etc.

The compiled programming language statements can be associated with the virtual object or other synthetic data at 708. In some embodiments, subsequent execution of the virtual object can proceed against already compiled operations. Any synthetic data can be associated with programming language statements and any interpretation/execution of the synthetic data can include storing of the compiled routines at 708. In some embodiments, accessing compiled, executable code, and/or partially-compiled code for subsequent interpretation can improve execution of the synthetic data.

In some embodiments, synthetic data definition can include compilation of programming language statements defined for the synthetic data. For examples, programming language statements can be compiled during definition and be stored as pre-compiled executable code or as partially-compiled code for later interpretation or runtime execution. In some embodiments, execution of programming language statements can be stored within object attributes can be associated with the executable code generated by, for example, a run-time compiler. In other embodiment, executable code, pre-compiled, or partially-compiled code can be stored as data attributes. Subsequent access to the synthetic data can interpreted/executed against the stored compiled and/or partially compiled code. In some embodiments, the programming language statements stored as attributes can be replaced by pre-compiled code, pre-compiled statements, partially compiled code, etc.

In some embodiments, resolving programming language statements can include just in time processing operations configured to process synthetic data/programming language statements upon access. The just in time processing can include caching of results and/or storage of compiler routines at 708.

According to another embodiment, synthetic data can include virtual group objects. Virtual group objects can dynamically determine membership within the virtual group as data information requests are processed. The virtual groups can be used to enforce views of collections of information, for example, filtering the data available to respond to information requests based on the requesting user and/or entity. Virtual groupings can be configured to dynamically determine membership irrespective of the underlying organizations of any data being accessed. For example programming language statements associated with a virtual group object can define membership operations independent of the underlying format or organization of data within a collection of information.

Figure 8:
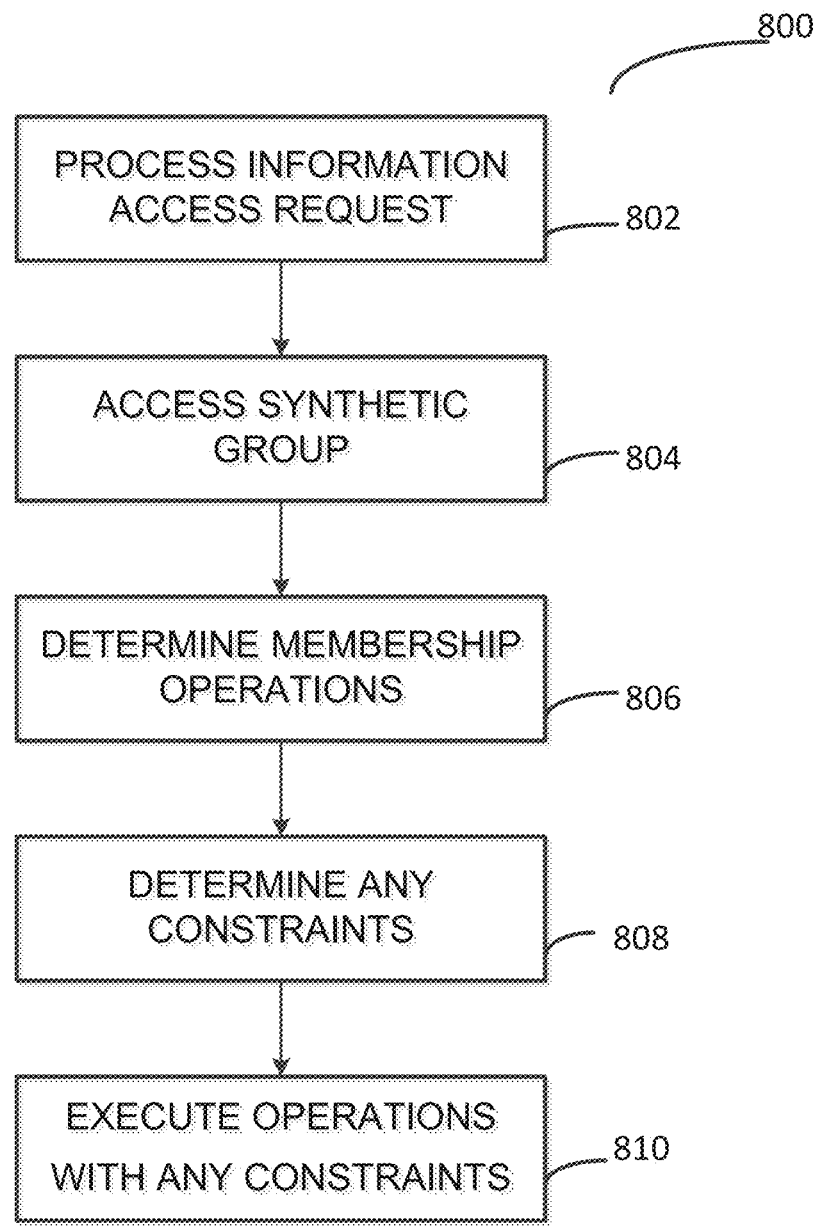
FIG. 8 illustrates an example process for determining membership in a synthetic group according to one embodiment of the present invention.

Shown in FIG. 8 is an example process 800 for determining membership in a synthetic data group. Process 800 begins at 802 with processing an information access request. The information access request can include navigation selections in a user interface, query terms or queries executed against a collection of information, as some examples. Information access requests can include resolving relationship information stored as an attribute of a data within the collection, and can also include operations to identify and/or evaluate candidate refinement options for data returned from a collection.

In response to any information request, synthetic data groupings can be identified. For example, virtual group object can be identified and accessed at 804. The virtual groups objects can include operations stored as programming language statements that when executed determined the membership of the group defined by the virtual group object. The operations can be constrained to operate on defined subsets of the data stored with in a collection. In one example, constraints can be defined for any virtual group object. In some embodiments, constraints can be defined and stored separately from membership operations in a virtual group object as an attribute. When executed the constraint operations can be configured to filter the members of the virtual group, expand the membership of the group, add additional information sources for resolution of the membership operations, among other examples.

Virtual group objects can be accessed, and the membership operations defined for the virtual group object are determined at 806. Determination of the virtual group membership operations can include compilation of the programming language statements, if they have not already been compiled. Additionally any constraints on the membership operations can be determined at 808. In some embodiments, membership operations and any constraints can be defined together as part of establishing a virtual group object and steps 806 and 808 can be executed together or can be executed as one step. In some embodiments, step 808 is optional as separate constraint operations are not defined. The membership operations are executed at 810 in conjunction with any constraint operations. The member of the virtual group returned by the execution at 810 can also include further synthetic data. In some embodiments, the further synthetic data can include additional virtual group objects, which in one example, can be processed by additional execution of process 800.

In some embodiments, optimization of execution can identify addition synthetic data in the members that will be returned upon execution of the operations at 810. In one example, any additional membership/constraint operations can be identified and included in run time optimizations prior to execution at 810. Other synthetic data and associated operations can also be combined with the execution of operations at 810 to improve execution performance.

Creating Synthetic Data

According to one embodiment, an interactive editing environment for the creation of semantic layer objects is provided. In one embodiment, new objects can be created, named, and associated with other semantic objects and/or native database objects, using a user interface displayed to user connected to an information retrieval system. In one embodiment, the information retrieval system can include a faceted search and navigation interface. The faceted search and navigation interface can be configured to permit definition of new objects, definition of objects names, definition of relationships between semantic objects and/or native data objects (e.g., data objects physically stored in a collection of information). In one embodiment, the search and navigation interface permits the collection of database objects (both native objects and any created virtual objects) to be browsed and selected for incorporation as part of a new virtual object definition.

In some embodiments, an interface for an information retrieval system is configured to present selectable options to a user that permit definition of synthetic data. In one embodiment, definition of synthetic data can include definition of any one of: a virtual group of data objects, data elements, and/or data attributes; a virtual object; a virtual data element; and a virtual data attribute.

For example, definition of a virtual object in the interface includes selecting an option in the interface to create a virtual object. The interface can be configure to responds by displaying a visualization of the data on which the virtual object can be associated with and/or perform operations on. For example, a user can identify native data object(s) stored in collection on which the user wishes to define operations for execution. In another example, the user can identify virtual objects, virtual data, virtual groups, and/or native data stored in collection on which the user wishes to define operations for execution.

Once the data the user wishes to associate with the virtual object is defined, the user can specify operations to execute against the associated data. In one embodiment, the operation(s) can be specified in the user interface for selection by the user. For example, operations on the data can include arithmetic and logical operations, algorithms specified using programming language statements, object relationship definition, and/or grouping operations that can be selected in the user interface. Multiple operations can be defined and/or interactively selected for incorporation in the new virtual object definition. In some embodiments, the order of selection of the operations can establish an execution order for the operations selected. In further embodiments, the user can interactively view the result of the operation(s) as the user selects within the user interface. The display of the result of the operations can also include validity checking processes. In one example, the operation defined can generate a set of incompatible results or attempt to perform operations on conflicting values, determined, for example, based on the units of measure associated with the combination. The user interface can highlight the conflict for the user's review during selections of the operations.

Further the interface can be configured to recommend incorporation of other data attributes that may resolve the identified conflict. In one embodiment, similar to the determination of refinements, attributes of data object under consideration can be identified and evaluated against, for example, any unit violations to determine if an additional association(s) can resolve the conflict. In another example, bounding issues can be evaluated on the data values under consideration. For example, outlier data value can be identified from statistical analysis. In some examples, identification of outlier values can be resolved by suggesting exclusion the data values and/or the data attributes that generate the outlier values.

In some embodiments, the operations can be defined on previously configured objects, and in other embodiments, the operations can include parameterization of previously-configured definitions. Additional operations can also include incorporation of implicit or explicit query operations, and enable execution of simple and complex query terms, query filters, and queries with joins, within an object's definition. According to one embodiment, any combination of available operations is permitted. In some implementations, a limit on the number of operations can be enforced to insure processing of the virtual objects can be executed in a reasonable period of time.

Example User Interfaces for Creating Synthetic Data

Figure 11:
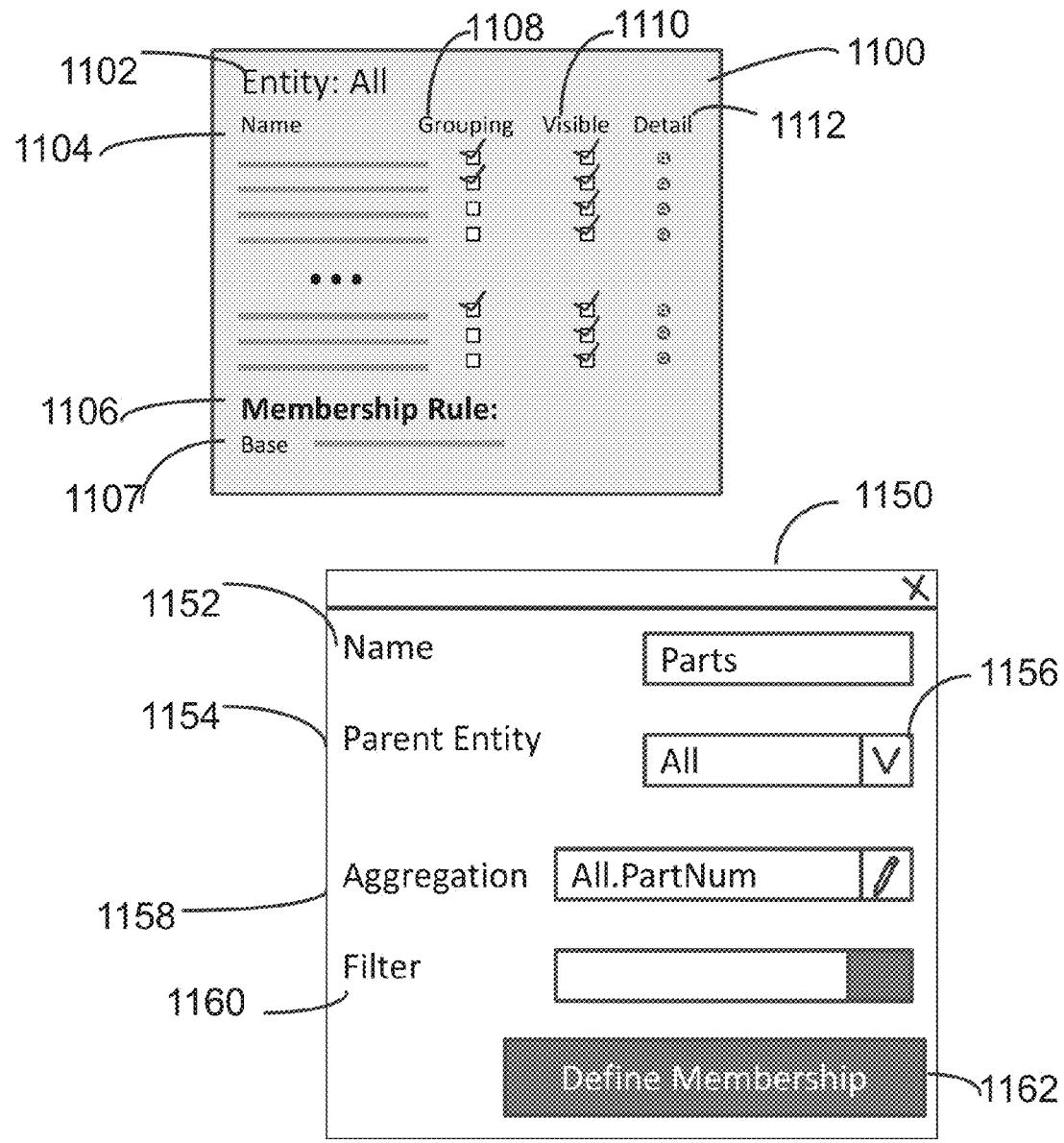
FIG. 11 is an example user interface of according to one embodiments of the present invention.

Shown in FIG. 11 is an example user interface 1100 for defining virtual objects. Interface 1100 can include an entity relationship diagram of the data available on which to define virtual objects. Each virtual object can be identified in relation to an available entity relationship through the user interface 1100. When initially accessed, the user interface 1100 can provide by default a view of all the data available for a collection of information. In some embodiments, the user interface presents the data within a collection of information as selectable data entities, relationships, and corresponding attributes. In one embodiment, an entity can be defined based on grouping operations and filtering operations performed on a base set of data. In one example, the base set of data can be defined as all the data accessible on an information retrieval system (including, for example, native data and virtual data). In another embodiment, the base set of data can be displayed and/or defined in response to data access operations performed on an information retrieval system. For example, a user can interact with the data in a collection of information, through, for example, entered queries and/or navigations selections. The various interactions between the user and the information retrieval system can result in a view of a set of data obtained from the collection—which may include synthetic data.

The view of the set of data can be maintained, for example, when user interface 1100 is accessed. The result of maintaining the currently viewed set of data is a different base on which entities, groupings, filters, and membership rules are displayed in 1100.

According to one embodiment, interface 1100 displays data object attributes from the base set of objects using a name 1104. The base set of data can be defined by default to include all available data. In one embodiment, a base can be defined and/or modified for individual entities being generated in the user interface.

In one example, a base data set can be defined by membership rules that can be configured to operate as filters on an available set of data to generate the base set on which an entity can be defined. In one example, a base data set is made available to the user for viewing in the user interface by having no membership rules. In one example, the interface can display any active membership rules at 1106. In some embodiments, the display at 1106 can be selectable in the user interface to transition the system to a display of membership information, discussed in greater detail below.

The currently defined base set of records can be displayed in the user interface at 1107. Additional information on the available objects can also be displayed. For example, in user interface 1100, access control information can be displayed at 1110. In particular, whether the data object is visible in a current data context is indicated by a visible column, and each data object or attribute can be displayed with a checkbox for data visible in a current context and without a check for data not visible in a current context. Grouping of data objects can also be reflected in the user interface at 1108. Additional detail can be accessible in a display of the user interface 1100 for each data object and/or data attribute. For example, a selectable detail icon is displayed in column 1112 next to the data objects. Selection of the icon displayed in column 1112 triggers the user interface to access detail information on the selected data object.

In one embodiment, the detail view of a data object enables more specific definition of entities and/or virtual objects. For example, within a detailed view, the user interface can enable definition of operations on individual data attributes and/or selection of multiple data attributes for the object being view in detail. In some examples, the definition of operations on individual data attributes and/or selections of multiple data attributes can be coupled with selection of other attribute(s) in other data objects to define new data groups. In other examples, a virtual object can define groupings on the selected attributes shown in a detail view.

Example interface 1100 illustrates a view of an entity relationship diagram ("ERD"). In one embodiment, upon first access the only entity defined and thus the only entity displayed in the entity relationship diagram is the Entity: All. The "Entity: All" establishes the attributes, groupings, objects, etc. represented by all the data in a base set of data. According to one embodiment, the virtual objects can be defined in the user interface based on information derived from a parent entity. Shown in interface 1100 is the ultimate parent entity from which all other entities are derived, either directly or indirectly. The "Entity: All" establishes the attributes, grouping, objects, etc. represented by all the data in a base set of data. New entities can be created, for example, through interaction with user interface at 1150.

The display of create a new entity in the user interface at 1150 can be executed upon selection, for example, in interface 1100. Interface 1100 can include a selection option "create new entity" (not shown), that when selected cause the information retrieval system to display a create a new entity interface 1150. The new entity can be assigned a name at 1152. In one example, the user can input a name at 1152. In other embodiments, naming conventions can be defined on the information retrieval system and selections of predefined names can be made available at 1152.

A name can be stored as an attribute of the new virtual object/entity being created. In some embodiments, the name defined for the entity is used to provide access to the entity in the same name space as the native objects or other virtual objects stored in a collection of information. A parent entity can be displayed at 1154 for selection. In other embodiments, a variety of entities can be defined. Each defined entity can be selected via a drop down menu at 1156. Any definition of grouping, filters, aggregation operations, base data, etc., for the selected parent entity can be inherited by the newly created entity. Aggregation operations can be defined for the new entity at 1158. In one embodiment, the aggregation operations enable further selection and/or definition of attributes available from the parent entity. In one example, a newly created entity can reference all of the attributes available in a parent entity. In some embodiments, the attributes for the new entity can be further defined from the available attributes to reference subsets of the available attributes from a parent entity. In other embodiments, additional attributes can be defined for an entity.

Any available entity can be selected, for example through a parent entity drop down menu at 1156. Once an entity is selected and any aggregation operations defined at 1158 filter operations can be defined for the entity at 1160. Filter operation enable definition of rules for data filtering. The data filtering can operate on data values, data attributes, data groupings, virtual data, etc. Aggregation definition and filter definition can include generation of programming language statements that can be interpreted by an information retrieval system upon access to the entity.

In one embodiment, the user interface includes an selectable display "define membership" at 1162. In response to selection of "define membership" at 1162, the information retrieval system is configured to execute a transition to another user interface display.

Figure 12:
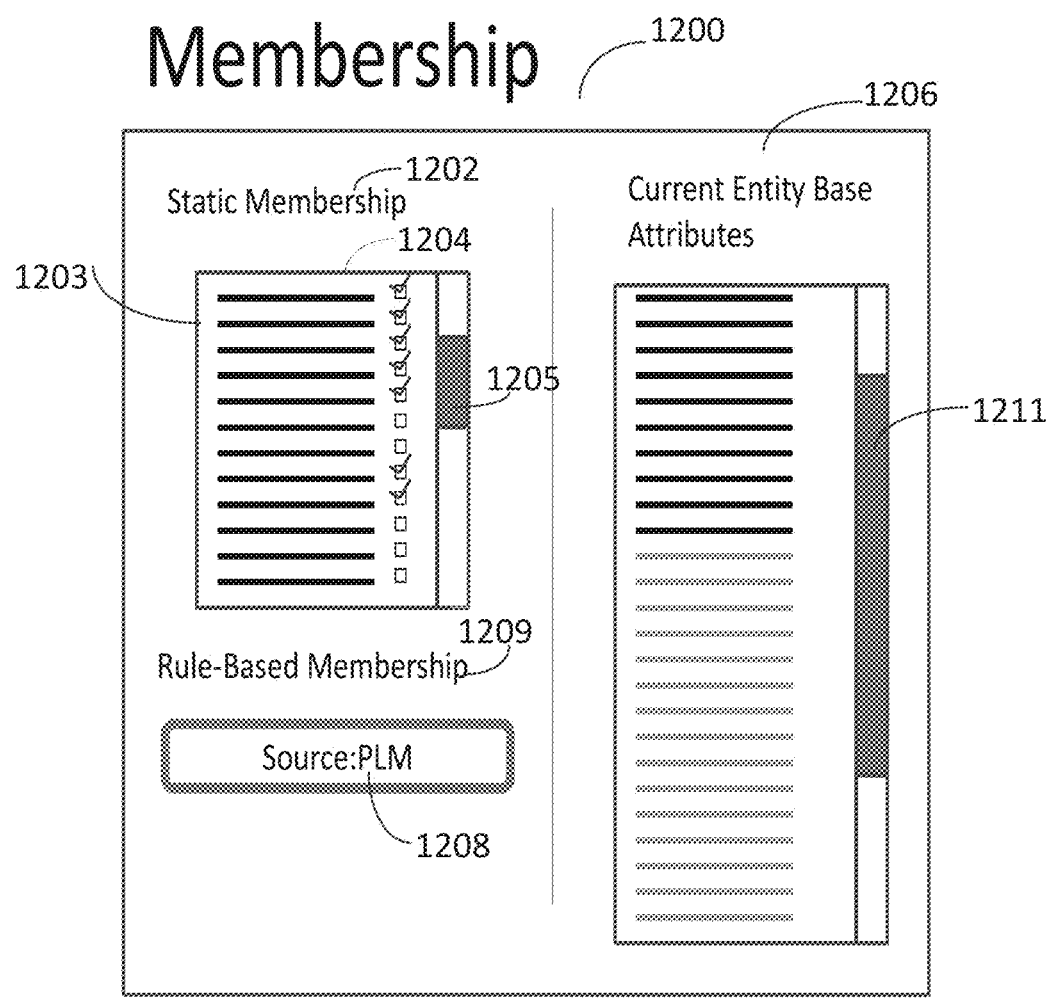
FIG. 12 is an example user interface of according to one embodiments of the present invention.

Shown in FIG. 12 is an example user interface 1200. User interface 1200 can be configured to present options for defining membership of an entity. Membership definition can include identification of static members of the entity at 1202. Static members can be displayed in a selectable list at 1203. In one embodiment, the list of selectable members include data attributes derived from a parent entity (e.g., as selected at 1156 in FIG. 11). Each of the selectable members can be displayed with a visual indictor identifying whether the selectable member is included or not. In one example, at 1204 a check box can be displayed. Members with checks in the check box reflect members defined for the entity. A scroll bar 1205 can be configured to present members outside a viewing area display in response to selection and/or movement of the scroll bar at 1205.

A display in the interface at 1206 can provide a list of the current entity base attributes. The list of the current entity base attributes can be determined from the static members selected at 1203 as modified and/or augmented at 1208. The list of current entity base attributes can include a scroll bar 1211 for visualization attributes outside of the display area. A heading display at 1209 can indicate within the user interface that the data shown at 1208 is associated with defining membership for the entity and the membership can be selected based on dynamically determined rules.

In one embodiment, the membership rules can be configured to operate on attribute metadata. In some examples, the membership rules are limited to operations defined on attribute metadata. In one embodiment, the attribute metadata can include augmented data for data attributes available on a collection of information, as discussed below. Membership rules defined at 1208 can implement definition of and/or operations on, for example, units of measure, data provenance and lineage, data freshness, data formatting, access rights, naming convention, attribute taxonomies, sub-attribute generation, data view generation/enforcement, personalization, tokenization, external data reference, dynamic operations, and join relationships, as discussed below.

In one example, rule-based membership can be configured based on a data source. For example at 1208 data source: PLM references a product lifecycle management ("PLM") data source. Various data sources can have known attribute metadata characteristics. Identifying source: PLM at 1208 permits operations on and/or definition of membership rules based on the metadata characteristics defined for the source.

In one embodiment, upon definition of the new entity validity checking operations can determine if the selections made result in a valid entity definition. If the entity is determined valid, the entity can be stored for subsequent access by an information retrieval system.

Figure 13:
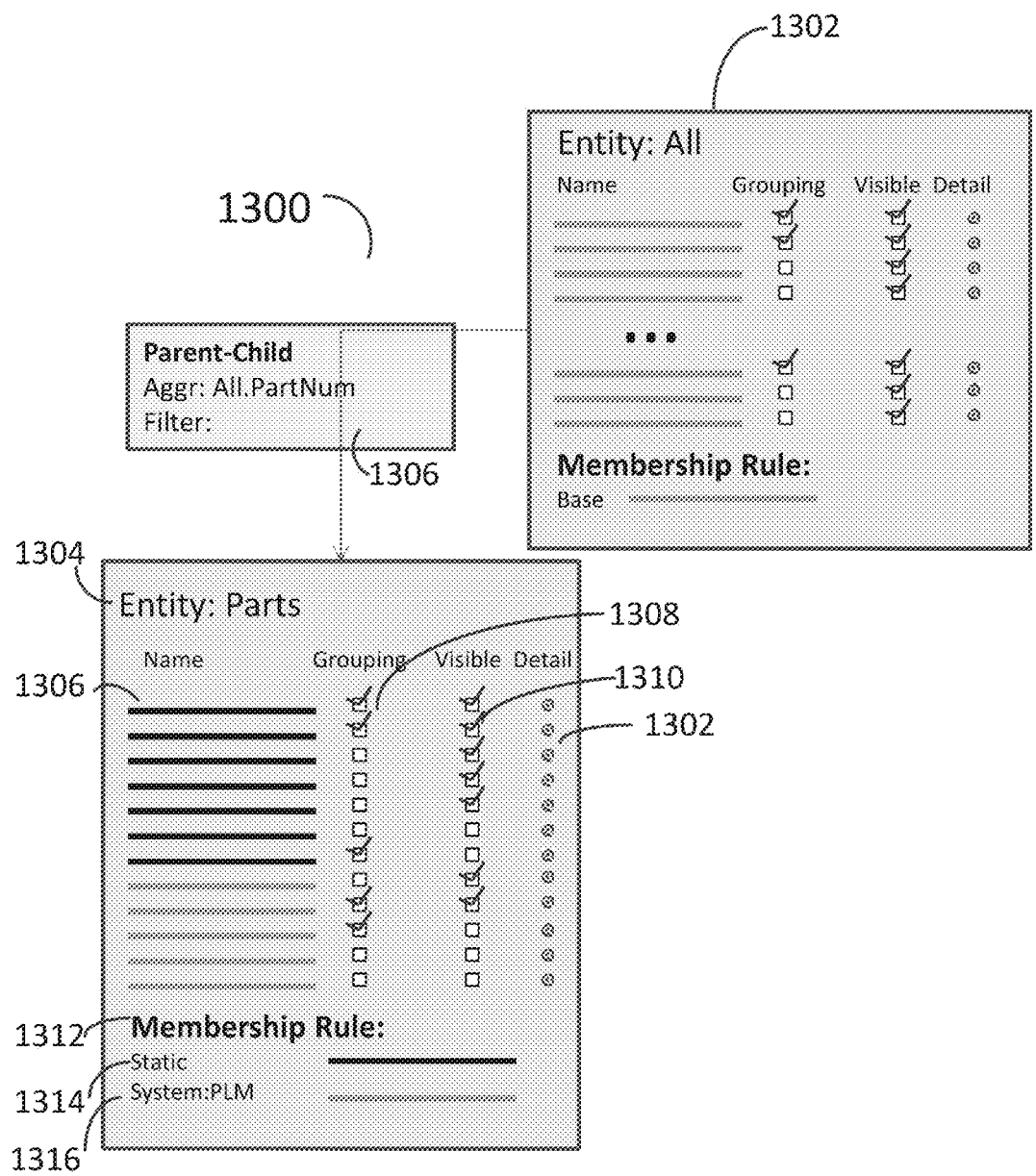
FIG. 13 is an example user interface of according to one embodiments of the present invention.

Shown in FIG. 13 is an example user interface display 1300. The example user interface display, illustrates an ERD diagram of the Entity: ALL 1302 discussed with respect to FIG. 11 and a newly created Entity: Parts, 1304. The diagram includes relationship information for the entities 1302 and 1304 at 1306. In particular, Entity: Parts is a child entity of 1302. The relationship information displayed at 1306 can include the display of the aggregation operation defined for the entity 1304—for example, aggregation operators can be defined in FIG. 11 at 1158. In some embodiments, the relationship information 1306 can include filter information defined for the child entity 1304. The child entity parts are displayed in the same format as the parent entity used to generate entity 1304. For example, entity 1304 is displayed with a list of attributes at 1306, grouping options at 1308, visibility selections at 1310, and the ability to view additional detail at 1311. At 1312 membership rules defined for the entity can be displayed. For example, any static membership selections made for the entity can be displayed at 1314. 1314 can be configured to reflect summary information for static membership selections, including for example, display of some attributes identified in the static membership for the entity. At 1316 any dynamic membership rules can be displayed. In one example, membership rule data source: PLM can be displayed at 1316.

In some embodiments, the definition of entities and/or virtual objects can be presented to a user based on free input of programming language statements. A user can be permitted to define an entity, a relationship to another entity, if any, by inputting programming language statements directly. The programming language statements can be evaluated as they are entered to determine if the user has correctly defined an entity based on the statement entered. In some embodiments, statement definitions can be presented to a user similar to the user interface selections of 1152. For example, a user can define a current base set of data by inputting/defining query operations that establish a set of data, defining relationship information to other entities, inputting aggregation operations, and any filtering operations, etc.

Figure 14:
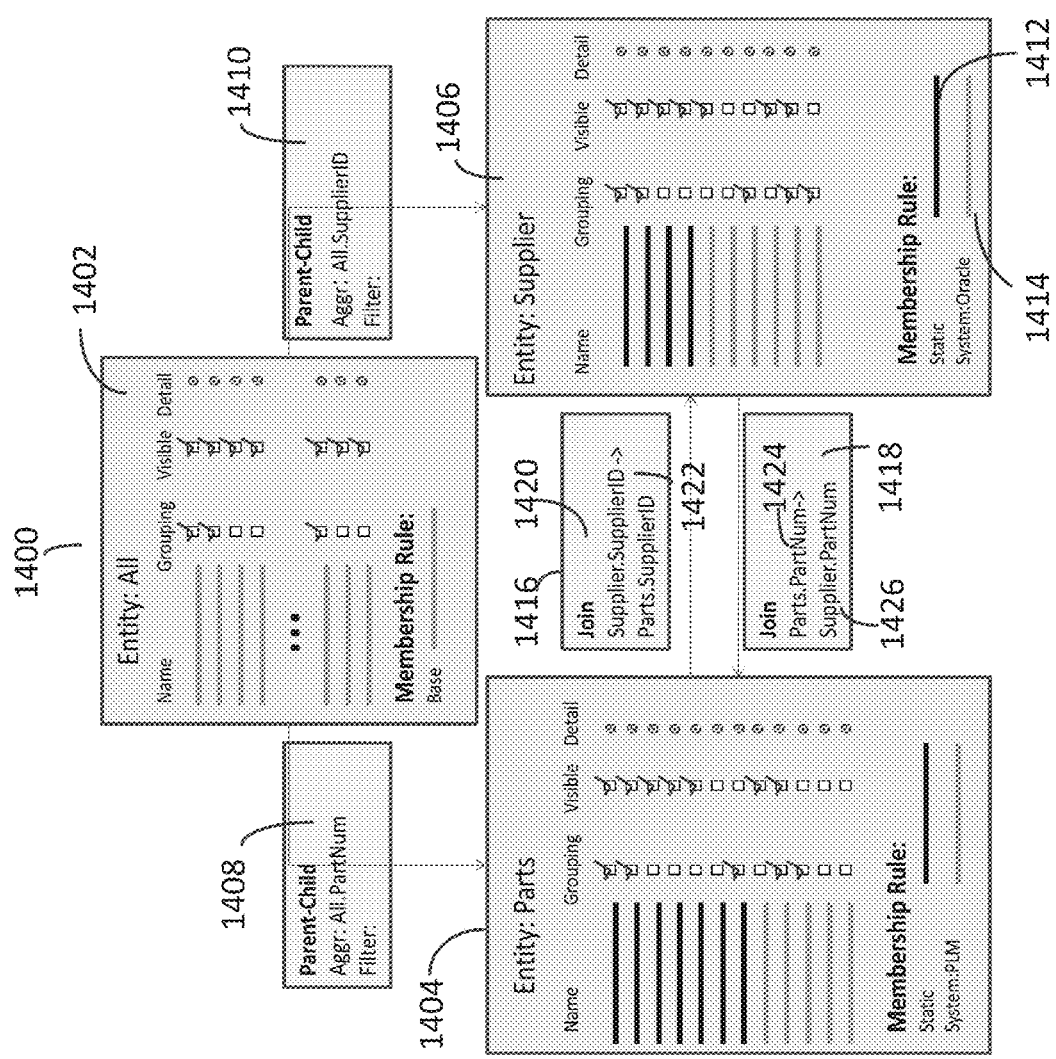
FIG. 14 is an example user interface of according to one embodiments of the present invention.

According to some embodiments, entity relationship diagrams of defined entities can include definition of operation between entities. Shown in FIG. 14, is an example user interface 1400. User interface 1400 displays available entities Entity: All 1402 discussed above, 1404 Entity: Parts 1404 discussed above with respect to FIG. 13, and new entity Entity: Supplier 1406. The relationships between the entities 1402, 1404, and 1406 can be displayed at 1408 and 1410. The relationship information can include details on the aggregation operation defined and/or filtering operations defined for the given entity.

At 1412 static membership definitions can be displayed and at 1414 dynamic membership rules can be displayed.

In addition to display of the entities 1402-1406 and the entity relationships 1408-1410, defined operations on the entities can also be displayed in the ERD shown in interface 1400. In some embodiments, a data architect can define operations between entities as part of administering an information retrieval system and/or administering the data accessible on the information retrieval system. For example, a data architect can define join operations between entities 1404 and 1406 specifying, for example, the entity/attribute for each portion of the join operation at 1420 and 1422. Multiple operations can be defined by the data architect, and displayed in interface 1400 at 1418. The display of the operations can include identification of detail associated with the operation, including for example, entity name.attribute name at 1424-1426.

In one embodiment, the data architect may define entities, relationship, and further defined inter-entity operations to implement an entity-centric view of a collection of information. The entity-centric view can be tailored to specific end users who wish to interact with data on the collection of information in a defined manner. In another embodiment, the entity-centric view can be implemented by a data architect to provide a data environment, for example, focused to a particular business task.

Data operations defined in relations to established entities (e.g., join operations 1416-1418) can be configured to facilitate the data environment, and/or insure relevant data access within the given data environment.

In one setting, business analyst may only wish to review subsets of data relevant to their business tasks. Entity definition illustrated in FIGS. 12-14 can provide the data environment optimal for addressing the business analyst's needs. To insure the integrity of a data environment, the operations that permit definition of entities implementing an entity-centric view can be limited to specific users, for example, data architects or systems administrators.

Figure 15:
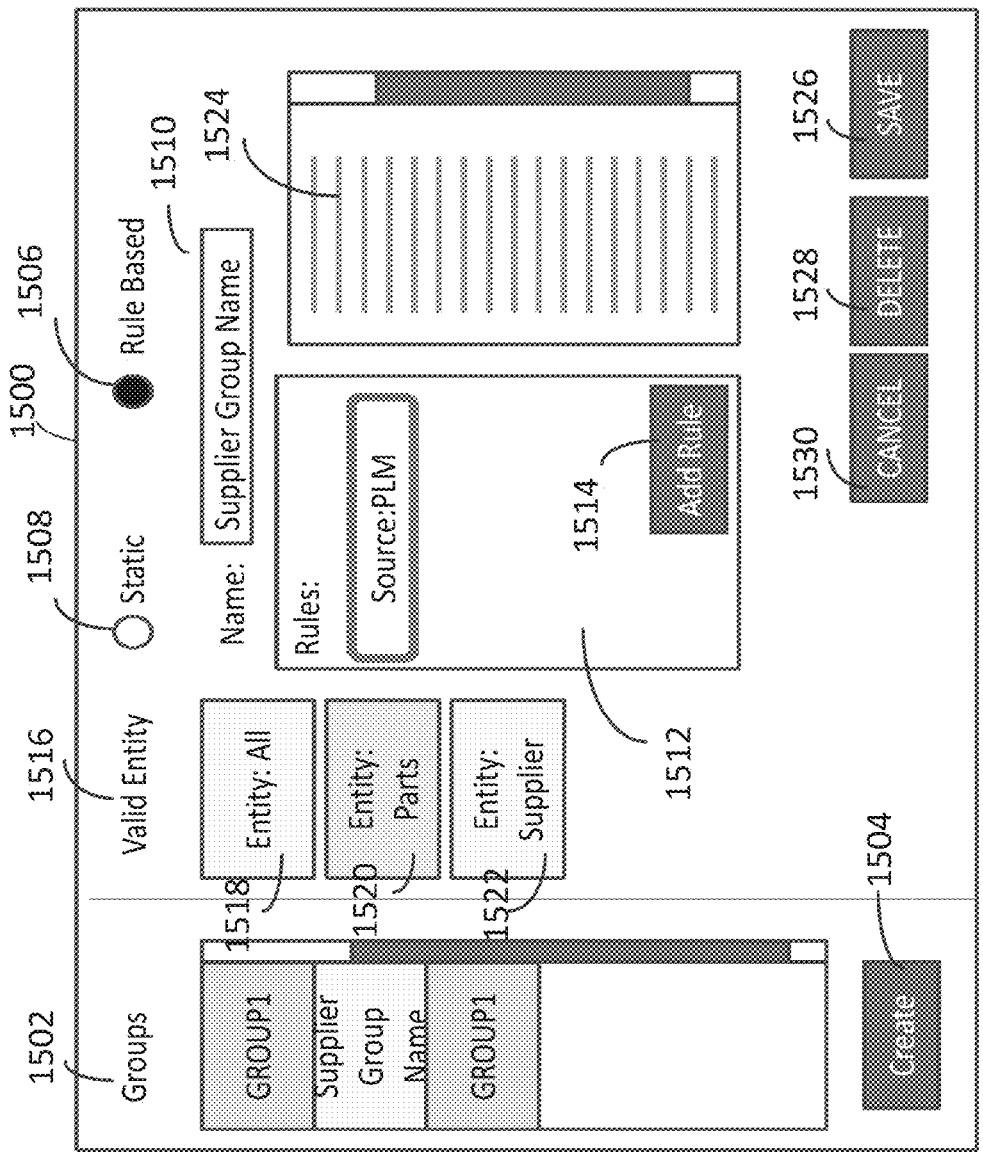
FIG. 15 is an example user interface of according to one embodiments of the present invention.

In some embodiments, different user roles can be defined to permit other users to implement additional views of the data, define virtual data, etc. In one example, a business administrator role can be defined that permits the business administrator to add virtual data, and/or modify base sets but not redefine the view in which they operate. Shown in FIG. 15 is an example user interface 1500. Interface 1500 is configured to permit a user to define additional entities, virtual objects, or data groupings within a pre-defined data environment. In one example, the pre-defined data environment can be established by a data architect defining entities that establish the data accessible in the data environment.

Data groups defined in the environment can be displayed in the interface at 1502. The user can define additional groups to access by selecting create at 1504. New groups can be defined using dynamic membership rules by selecting 1506. Static membership selections can also be made, for example, by selecting 1508. The user can input a name for the new grouping of data at 1510. Selection of 1506 is configured to present any already configured membership rules in display 1512. Selecting add rule 1514 in display 1512 is configured to permit the user to define new membership rules for the group. The new membership rules can be defined by the user by inputting programming language statements that can be executed to filter, aggregate, refine, perform arithmetic operations, etc. on any of the available data. In other embodiments, predefined operations can be presented to a user for selection to define new grouping rules.

At 1516 any entities defined in the data environment can be displayed. The valid entities 1518-1522 can be selected to establish a base set of data, attributes, membership rule, which can be modified or augmented to establish a new group. The current group attributes can be displayed at 1524. As new rules are added, the current group attribute membership can be updated in display 1524. Once new rules have been defined for the group and the current attribute membership meets the user's need, the new group object can be save by selecting save at 1526. In some embodiments, validity for the new group can be verified as the group is being defined. In other embodiments, the group can be checked for validity in response to saving the group. Alternatively, new group definition can be cancelled by selecting at 1530. New groups can be also be deleted at 1528.

Figure 16:
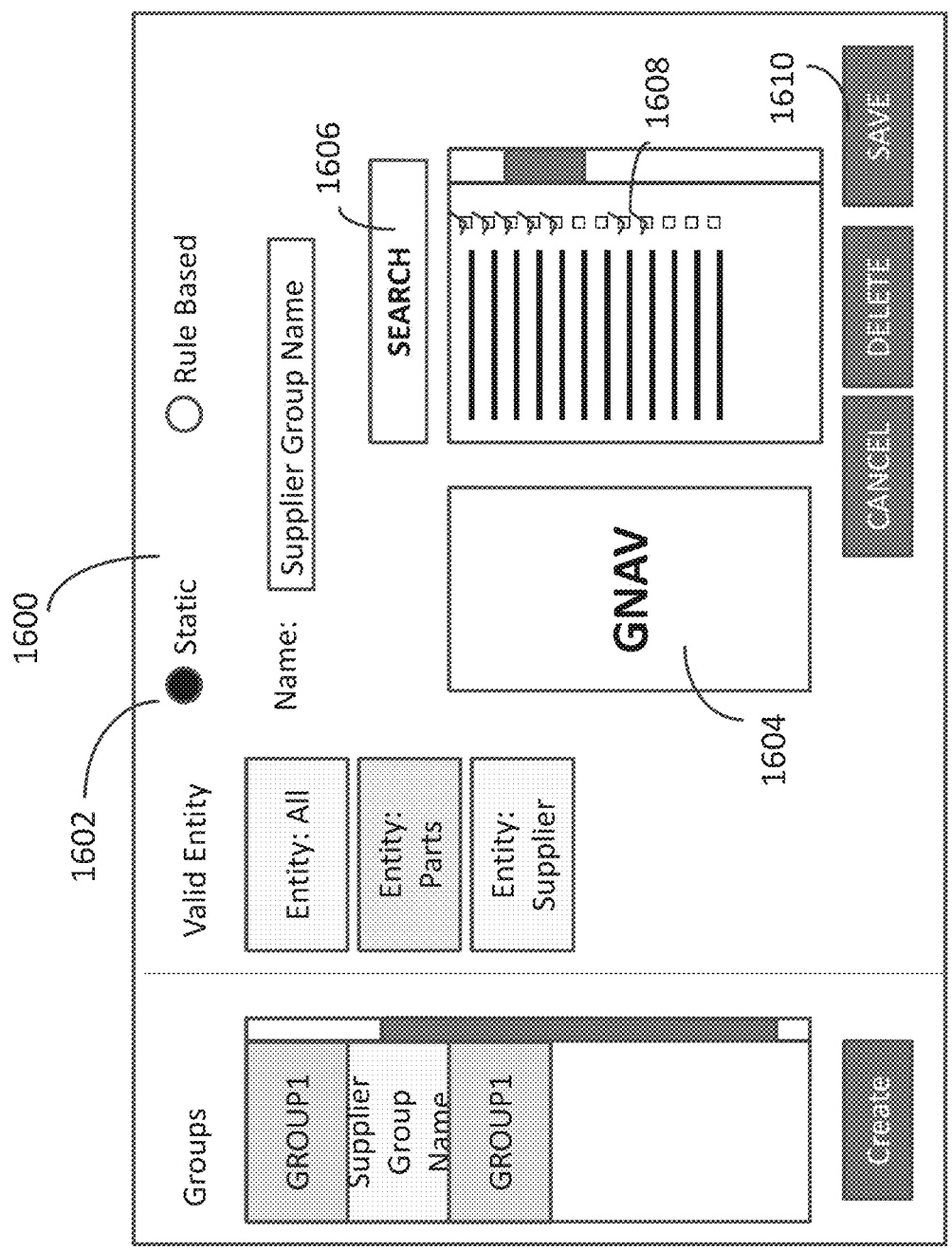
FIG. 16 is an example user interface of according to one embodiments of the present invention.

As discussed above, membership in a new group can be defined based on static definition of attributes. Shown in FIG. 16 is an example user interface 1600. Interface 1600 is configured to permit a user to define additional entities, virtual objects, or data groupings within a pre-defined data environment. Interface 1600 is configured in the same manner as user interface 1500 with the exception that the static attribute membership options are displayed. For example, in response to selection of static at 1602 static membership displays are presented in the user interface at 1604, 1606, and/or 1608. At 1604, a guided navigation display is presented in user interface 1600. The guided navigation interface 1604 is configured to permit a user to navigate within available data in the defined data environment. The user may select data facets of data stored in a collection (for the data that is also available in the data environment). Selection of data facets permits the user to select data attributes from any data object access in the guided navigation interface 1604. Selections made in the guide navigation interface can be configured to display the attributes associated with the selection in 1604 at 1608.

Any available data attributes, which can be native data attributes and/or virtual data attributes, associated with the selections made in 1604 are displayed at 1608. At 1068, available data attributes are displayed with check boxes. For each attribute in the data group a check appears in a check box shown in 1608. Additional attributes can be added to the group by selecting new check boxes in display 1608. Interface 1600 include addition data selection features that can be configured to enable a user to select new data objects, data attributes, etc. In one embodiment, a search box can be displayed in user interface 1600 at 1606. In one embodiment, the search box can be configured to accepted text queries on the data accessible in the current data environment. Data returned that is responsive to the input query can be displayed in the guided navigation display 1604. In addition, the data returned responsive to the input query can be associated with data attributes. The associated data attributes can be displayed at 1608. A user can select from the display attributes to establish the new group. Once the user has selected any new attributes the new group can be saved by selecting save at 1610.

In some embodiments, entity definition can be configured to provide a specific view of the data stored in a collection. In further embodiments, data groupings can be established within a particular view of the data. Both data views and data groupings can be employed by, for example, a business analyst to interact more efficiently with the data in a collection of information.

Figure 17:
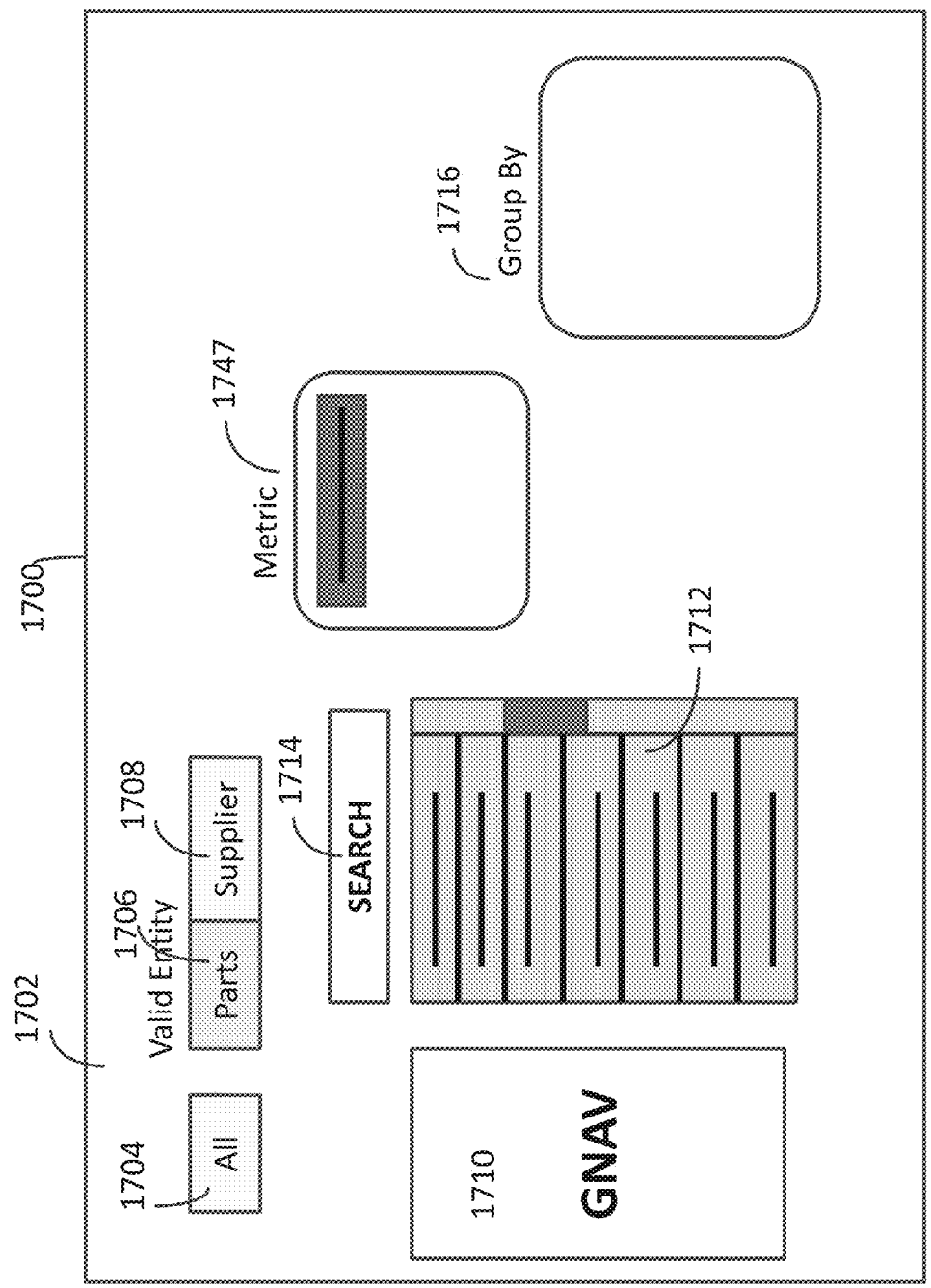
FIG. 17 is an example user interface of according to one embodiments of the present invention.

Shown in FIG. 17 is an example user interface 1700. Interface 1700 is configured to provide a user access to a data environment provided by any defined entities, with any additional data groupings available for selection. Shown at 1702 is a display for valid entities defined for the view of the collection of information. Available entities can be displayed at 1704, 1706, and 1708 (All, Parts, and Supplier, respectively). Interface 1700 can include a guided navigation display at 1710.

The guided navigation display 1710 can present an interface configured to permit a user to navigate within available data in the defined data environment. The user may select, for example, data facets of data stored in a collection (for the data that is also available in the data environment). Selection of data facets in display 1710 is configured to permit the user to select subsets of data from the collection, including, for example, data attributes from any native data object and/or virtual data object. The returned subsets of data can be displayed in user interface 1700 at 1712.

In one embodiment, a search box can be displayed in user interface 1700 at 1714. In one embodiment, the search box can be configured to accepted text queries on the data accessible in the current data environment. Data returned that is responsive to the input query can be displayed in the guided navigation display 1710 and 1712. A user can view data objects and attributes in 1712. In some embodiments, the user can select data attributes and/or objects in display 1712, and any metric associated with the selected data can be displayed at 1714. A user interacting with data in interface 1700 can also enter data operations, for example, group by operations at 1716 to manipulate a set of results returned from a collection.

In some embodiments, associated metrics can be defined by a user in a user interface when viewing data, data objects, and/or data attributes. Further data operations, including, group by, operations can be defined by a user in a user interface. In some examples, interface 1700 can be configured to permit a user to define metrics for data, including for example, defining data units for a specific attribute or operation. In other examples, interface 1700 can be configured to permit a user to define data operations on selected data objects and/or attributes.

Figure 18A:
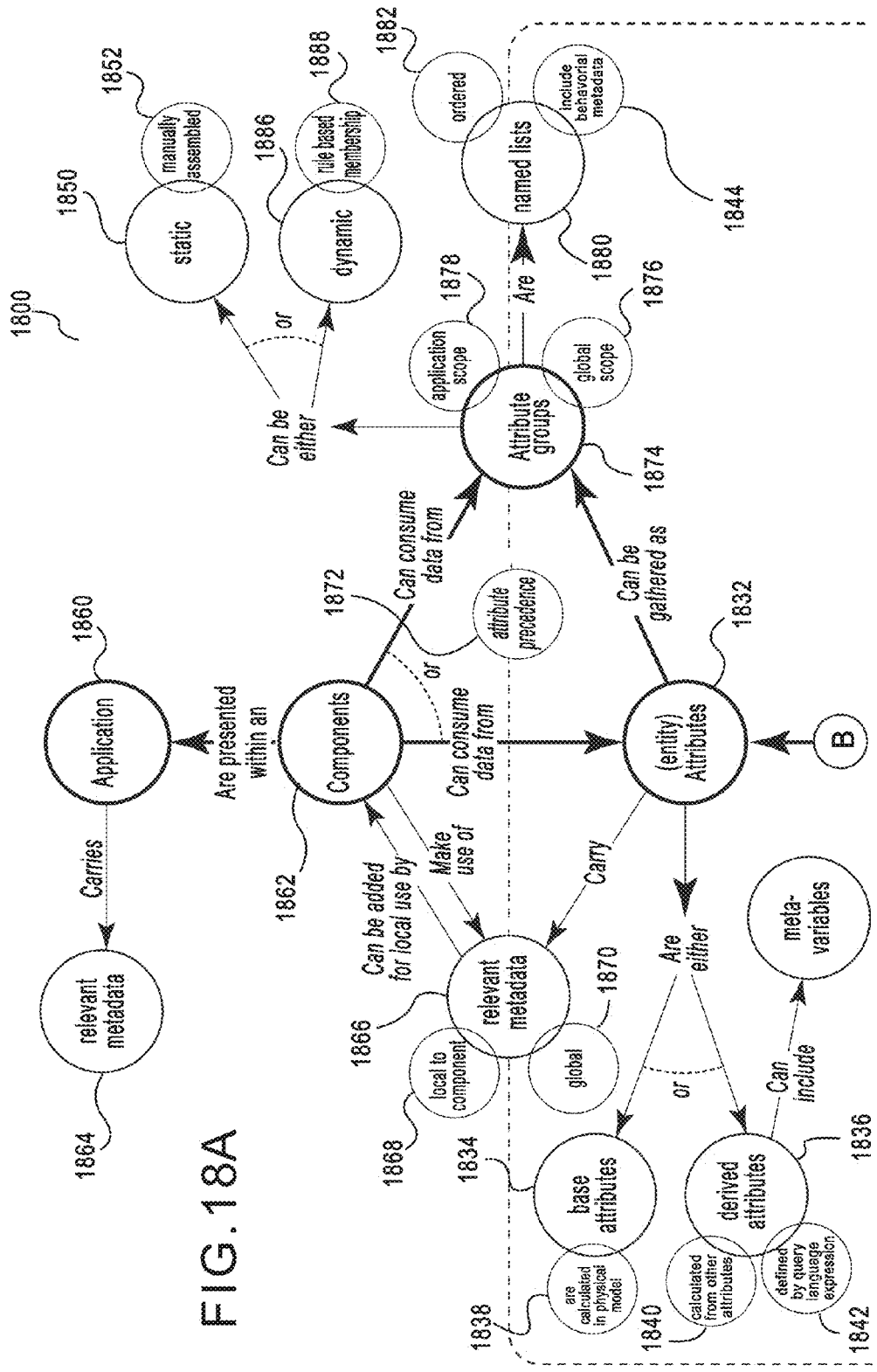
FIGS. 18A and 18B are an example concept map for organizing an entity based view of data according to one embodiment of the present invention.
Figure 18B:
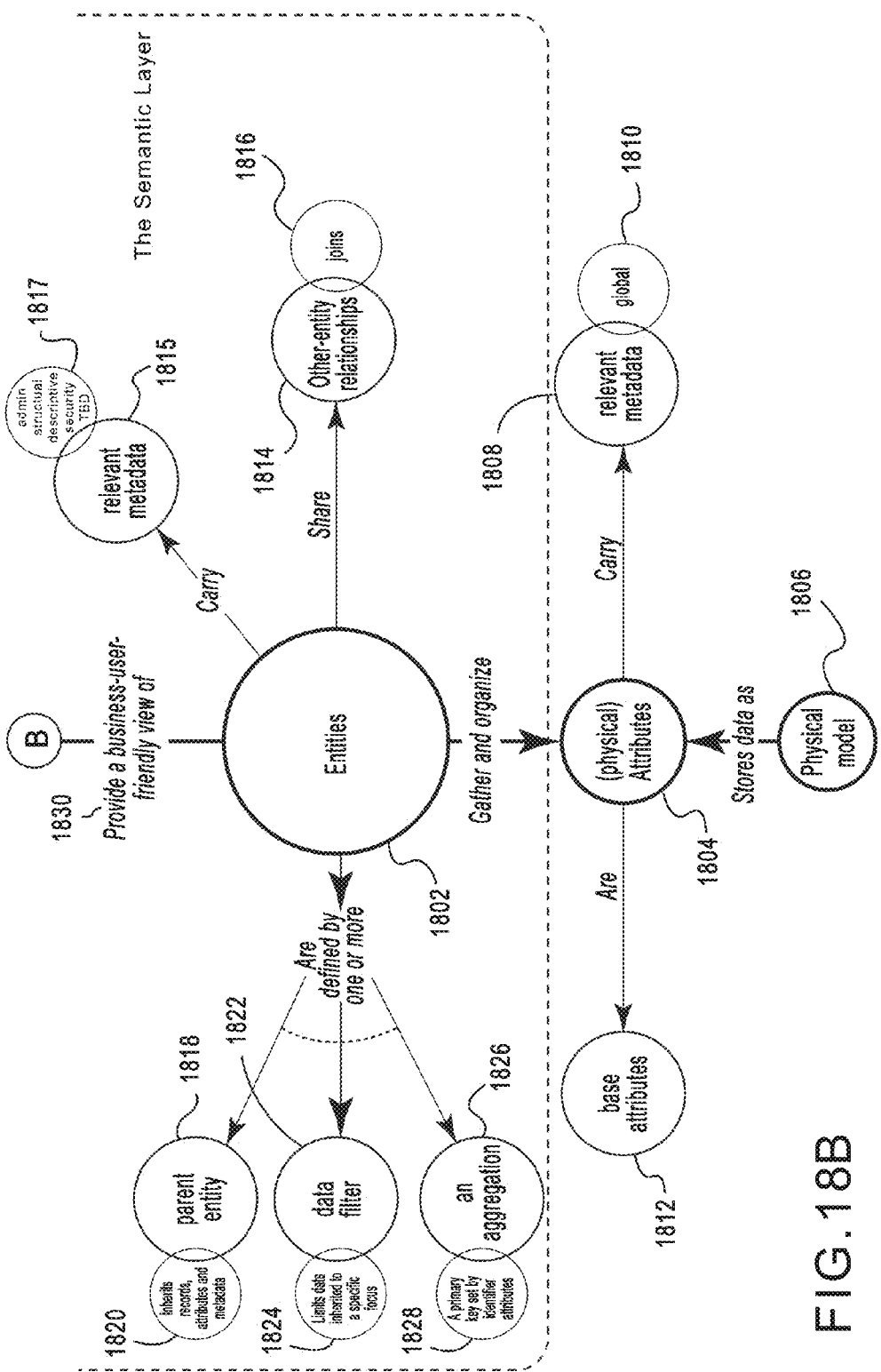

Various data organizations and structures within collections of information can be accessed by an information retrieval system implementing a semantic layer. The semantic layer can be organized under a variety of data models. FIGS. 18A and 18B illustrate one example of a concept map 1800 for organizing an entity based view of data within a collection of information. Entity based views can be defined using entities to organize and display various groupings of attributes, data objects, virtual attributes, and/or virtual data objects, among other examples.

In one embodiment, entities can be defined that gather and organize attributes of any data stored in one or more collections. Native data in the one or more collections can have a physical model 1806 or data structure, and each collection can have different physical models or more than one physical model for the native data stored in the one or more collections. Data attributes carry relevant metadata 1808, and the relevant metadata can be a part of a global definition of the metadata available 1810 through the one or more collections. Data attributes 1804 are used as base attributes 1812 on which entities 1802 can be defined. According to one embodiment, entities 1802 are configured to share relationships 1814, for example, with other entities, which can include, for example, join relationships 1816 between entities. Entities can also be configured to carry relevant metadata 1815 that can be configured to customized a user's or accessing application's interaction with the data made available by entities 1802. For example, relevant metadata 1815 can include any one or more of definitions for administrative rights, data structural constraints, descriptive metadata, security definition, among other options at 1817.

In some implementations, entities 1802 are further defined by any one or more of: a parent entity 1818 from which an entity (e.g., 1802) can inherit records, attributes, and metadata 1820; a data filter 1822 which can be configured to limit data inherited to a specific focus 1824; and an aggregation 1826 which can include a primary key set by an identifier attribute 1828. In some implementations, the entities are configured to provide a business friendly view 1830 of data stored in a collection if information.

The viewable set of attributes 1832 are made available by the entities defined for a particular view. Various views can be implemented, for example, based on business needs and specific entities encompassing the view can be defined on an information retrieval system. The set of attributes 1832 include at least one or more of base attributes 1834 which can be pre-calculated in a physical model 1838 and derived (virtual) attributes 1836 which can be calculated from other available attributes 1840 both physical and derived. In one example, derived attributes can be defined by a query language expression 1842 executed by the information retrieval system.

Viewable attributes 1832 can be further organizes into attribute groups 1874 defined by system operations and/or users accessing the system. Attribute groups can be defined to have global scope 1876, and global attribute groups may be made available throughout the information retrieval system. In some settings, global attribute groups may be restricted by other filters, permission, or access restrictions. Attribute groups can also be defined within the scope of an application 1878 used to access data on an information retrieval system. In one embodiment, the application scope can include a business view, set of business operations, or a business workflow/analysis application. Attribute groups 1874 can include name lists 1880 of attributes which can be used to present orderings 1882 of attribute data. In some examples, name lists 1880 can define behavioral metadata for the attribute group, individual attributes within the group, or combinations of attributes within the group.

The attribute groups 1874 can be defined by one or more of: dynamic membership computations 1886, which can include, for example, dynamically executed rule based membership operations 1888; and static attribute membership definition 1850, which can be selected manually 1852 by a user accessing an information retrieval system, in one example.

In some settings, a user accesses an information retrieval system through an application 1860. In one embodiment, the application can be local to a user machine that accesses a remotely located information retrieval system. In another embodiment, the application can be integrated with, and be implemented as a component of an information retrieval system.

In one embodiment, data access/interaction components can be presented to a user within the application 1860. For example, component(s) 1862 can be configured to consume data from entity attributes 1832 as well as any accessible attributes groups 1874. Components 1862 are presented within application 1860 to permit a user to request and/or interact with the data processed by the components. In some embodiments, application 1860 can carry relevant metadata regarding, for example, the user's data access context, access rights, permissions, privileges, etc. Relevant metadata 1864 can be used to customize the data that components 1862 can consume and/or present within application 1860. Components can be configured to consume data from attributes 1832 and attribute groups 1874 based on, for example, queries or navigation selections entered into application 1860.

Components can also be configured to control data access to entity attributes 1832 and attribute groups 1874 based on relevant metadata stored for either.

Available attributes 1832 can also be configured to carry relevant metadata 1866 that can be configured to customized a user's or accessing application's interaction with the data made available by entities, attributes, and/or attribute groups. In one embodiment, relevant metadata can define filters, aggregation operations, consistency checks, bounding operations, or other operations that can modify returned data. For example, relevant metadata 1866 can include any one or more of definitions for administrative rights, data structural constraints, descriptive metadata, security definition, data unit definition, among other options. Attribute level relevant metadata 1866 can be defined globally 1870 or can be defined locally 1868, that is specific to a user, an application, a component, etc.

In some embodiments, attributes 1832 and/or attribute groups 1874 can define an attribute precedent, which can also be configured to customize how data is returned to an application, component, and/or user. Attribute precedence can be configured to control, for example, an order of resolution of operations, calculations, and/or processing of attributes being consumed by components 1862.

Attribute Level Augmentation

According to one embodiment, the metadata associated with data objects stored in a collection and/or data stored in a database can be extended to include additional descriptive attributes. In some examples, synthetic data can also be extended to include addition descriptive attributes. For example, metadata associated with a data object (native or virtual) can be extended include: units of measure for attribute values, security associations such as access control lists for objects, attributes, and dimensions, and version/ update control information to identify data freshness, provenance, and history, as well as any one or more of the extended metadata attributes in various combination. According to one embodiment, an information retrieval system can implement definition of extended metadata for objects, attributes, records, data elements, etc. to enable validity checking. In one example, newly created or modified virtual objects, can be evaluated for validity. The evaluation can include, for example, verification that the units of measure of the virtual object are compatible with the units of measure of the underlying data used in computing a result from any defined operations. In one example, the operation defined for a virtual object includes an algebraic operation. The evaluation of the virtual object can include determination that the results units for the operation are compatible.

Other embodiments can include definition of data freshness as an attribute to be stored and/or associated with a data object, data attribute, data elements, etc. In one embodiment, the data freshness information can be evaluated, by the information retrieval system, to confirm all data in a computation is of the same generation or timeframe, or of compatible provenance. Still other embodiments can evaluate any synthetic data and/or any associated operation at time of query processing. Query processing can include, for example, consistency checking to assess whether all members of a dynamically selected group are comparable (e.g., determine whether a virtual group object definition is valid), and/or can include plausibility checking to evaluate whether the number of results obtained are within reasonable expectations. For example, plausibility checking can determine that a result obtain from an operation associated with synthetic data exceeds a statistically threshold. The information retrieval system can be configured to determine statistical distributions for expected results. If an execution returns a result far outside of the statistical distribution, the result can be determined invalid.

Units of Measure

According to one embodiment, the information retrieval system can enable definition of attribute regarding data stored in a collection. For example, metadata of data objects stored in a collection and/or data stored in a database can be associated with attributes that define units for the metadata, attributes, etc., that are stored in the collection or database. According to one aspect, allowing database object attributes to be assigned units enables significant functionality. For example, the display of all currency-related attributes may be provided in terms of a common currency, even if there are a variety of currency attributes that are of different base currencies (US Dollars, Euros, Yen etc). In one embodiment, the information retrieval system can execute computations on query results having different granularities (e.g., currency types) by normalizing the values of some of these measures to a common level (e.g., a common currency) to enable analysis and/or efficient execution of computations of the results and their values.

Examples of units that can be associated with data object attributes include volume, length, ratios, currency, and language, among other options. The units can also include conversion information on any one or more of: volume, length, ratios, currency, and language, among other options. According to another embodiment, the existence of unit of measure information enables enforcement of semi-additive measures by the information retrieval system.

For example, a default measurement model may be associated with an application program, with all database units being converted to those metrics defined for the measurement model for that application. In some embodiments, a variety of default measurement models can be defined, based, for example, on the application delivering results, a data context in which the database objects/attributes are accessed, etc. In some implementations, the definition of a default measurement model enables the information retrieval system to permit drag and drop configurations of virtual objects and/or attribute augmentation within a user interface. In other implementations, additional metadata fields are evaluated by the information retrieval system. For example, the information retrieval system can evaluate query processing to determine look-ahead options and identify and report errors responsive to conflicts in enhanced attribute metadata. In some embodiments, the information retrieval system can evaluate enhanced attribute metadata to provide interactive help to a user. For example, errors and conflicts can be identified and reported, and, for example, based on evaluations of attributes being analyzed, attributes, data objects, and/or data elements can be identified and suggested for inclusion/exclusion from current calculations. In another embodiment, the enhanced attribute metadata can be used in refinement determined and/or generation.

Data Provenance and Lineage

According to one embodiment, an information retrieval system can be configured to associated metadata with a data object attribute to identify, for example, which user created the attribute. The metadata can also include a definition of any one or more of: what process created that data, where the originated, how the data was transformed (including, for example, historic unit information, unit transformations perform on the data, operations performed on the data, etc.), any assumptions made/required to generate the data, and the processes executed to modify the data.

Data Freshness

According to another embodiment, the information retrieval system is configured to store a timestamp, for example, as an attribute of a synthetic data object. The time stamp can also be recorded on an attribute by attribute based. The time stamp can also be configured to record the last time an update was received for any value of an attribute. Other embodiments can implement timestamps associated with particular attributes of an object, or in one alternative can maintain the time stamp association at a record level. The record level timestamp can be configured to reflect when any value within a record and/or object was modified. Various embodiments of an information retrieval system can also be configured to preserve additional timestamp information including creation time, last access time, data version or batch-update number, etc.

Formatting

According to one embodiment, synthetic data can be used to store default format(s) for data objects stored in a collection. In some embodiments, synthetic data can also define default display formats for data stored in collection. In one embodiment, virtual data objects can define virtual attributes that can be used to store default file format and/or display format for any data field and/or any data attribute stored in a collection of information. In some embodiments, a data format can be derived from other enhances metadata information. For example, a particular data field or data attribute can have a default storage and/or display format associated with it automatically by a virtual object attribute based on a unit of measure defined on the data field or data attribute. In one example, arithmetic data can be identified by an information retrieval system, and a default format can be assigned via a virtual data attribute to include formatting of the data as a double floating point value with two decimal places, based on analysis of the units of measure of data used to generate the identified arithmetic data. In another example, data formats that can be assigned to data include floating point, hyperlink, or string, among other examples. In some embodiments, default formatting for data attributes, elements, etc. can be determined by the information retrieval system based on relationship information stored in a collection of information.

Column Level Security

According to another embodiment, semantic layer attributes can be defined on user level access to data or entity level access on data. For example, a virtual attribute can be defined and associated to any one of: a virtual object, virtual object attribute, native data object, native data object attributes, data elements, etc. The virtual attribute can store information about who (e.g., users, entities, applications, etc.) can access particular fields of data. In some embodiments, access information can be evaluated during, prior to, and in generating responses to information access requests. For example, access information is evaluated by applications which access a collection of information on an information retrieval system, or by processing layers in the information retrieval system, to secure access to raw attributes.

Display Names

In one embodiment, different users and administrators can access data on an information retrieval system. Different functionality and operations can be presented to the user population based on data stored in a semantic processing layer. The users may have different requirements for the naming of database elements than the administrators of the same database. The user population may prefer data attribute labels that represent familiar business structures, organizations, and terms. For database administrators however, the same labels are not descriptive enough or do not have an appropriate granularity and/or specificity to be useful to, for example, a data architect. Semantic layer attributes (e.g., a virtual data attribute) can store displayable names for elements of data including objects, object collections, attributes, and attribute collections, which may be utilized by database access applications targeting particular user communities, database administrators, data architects, etc.

Dimensional Cascade

In another embodiment, the information retrieval system can implement hierarchical dimension and/or inheritance of attributes as part of a data model used to organize a collection of information. Hierarchical dimensions can be used to display taxonomies of objects and object attributes (both native and virtual). Embodiments that include hierarchical dimensions/facets can be used by the information retrieval system when different levels of a hierarchy have different security considerations. In one example, security definition can be assigned at various levels in a hierarchy of dimensions. In particular, where certain users may have access to regional or generalized information, but not information at a finer granularity, hierarchical dimensions can include different security definitions at different levels of the hierarchy. In one embodiment, a logical hierarchy can be implemented by an information retrieval system based on virtual data attributes associated with data in the collection.

Examples of logical hierarchies include year→month→day, category→subcategory, and business unit→process area, among other examples. In some conventional approaches, such hierarchies can be embodied using different physical fields (native data fields) for each level of the hierarchy, with those fields comprising an explicit dimension hierarchy within the database. In one embodiment, a series of attributes that are not defined natively to be in an explicit hierarchy are defined to be in a logical hierarchical relationship, utilizing object metadata to indicate which attribute to cascade to, when the parent attribute filtering has been exhausted and a cascading down operation is appropriate.

Sub-Attribute Generation

In some embodiments, virtual data attributes can be broken out into multiple sub-attributes without actually storing the physically distinct values for any of the sub-attributes in a collection. For example, year information may be obtained from a date field in epoch time by calculation, e.g., converting epoch seconds to years, months, days, hours, minutes. In one embodiment, queries seeking, for example, specific year information are executed and access the virtual year data attribute derived from the epoch time. In other embodiments, a virtual data attribute can define a logical operation to convert a data attribute in corresponding sub-attributes. For example, data storing epoch time can be associated with virtual data attributes for any portion of time (e.g., day, month, year) and the epoch time can be converted into any desired range of date-based values. The reverse operation can also be defined with a virtual data attribute that converts day, month, year values into epoch time values.

Some embodiments can be configured to access virtual, dynamically computed, or logically equivalent sub-attributes in both query (e.g., filtering,) and analytics (e.g., computation based on query results) operations. In one embodiment, the operations that define sub-attribute computation and/or sub-attribute comparison operations can be subsumed or optimized into an overall execution plan for query execution. Some embodiments can be configured to be executed based on just-in-time compilation of query execution code, and the just-in-time completion can be configured to include the computations and/or comparisons on sub-attributes. Further, just-in-time processing can be combined with storage of complied code, partially compiled code for subsequent reuse. In one example, the code may be cached or retained for reuse.

Entity Based Views

Various conventional database systems implement data views for data reporting. Some presentation applications presume an explicit perspective on the underlying data schema for delivering data views to information consumers.

In some embodiments, a interpretation layer can implement views of the data stored in a collection of information, for example, based on operations defined by virtual objects and/or defined entities which can include virtual objects. The virtual or entity based views of the collections of information can be configured to deliver presentations of data facets and/or dimensions that are harmonious with a given perspective of the collection. Further, the views provided by the operations defined by any entity or virtual object can be configured to constrain the data that is accessed by subsequent query, filtering, and/or aggregation operations such that record count operations return consistent results within a given virtual view.

According to one aspect, abstracting entity views based, for example, on operations defined by semantic layer objects can assist in reconciling user interactions with collections of information. In particular, virtual views can be configured to allow record counts associated with filter operations to make sense in the context of the given view presented to a user. In one example, multiple views of data stored in a collection of information can be provided. A user interface can be configured to permit the user to select between data views, for example, by selecting a tab in the user interface to switch the perspective of the data stored in a collection.

In some embodiments, a tab/view can shares filter operations with another tab having another data perspective defined by, for example, different virtual objects, the new tab can be configured to evaluate the shared filters to determine which filters are consistent between the different tab views and which filters are inconsistent, and may need to be ignored to protect the integrity of the perspective delivered by a tab view. The source of the data can be associated with a particular view. The virtual objects and/or the operations executed by the virtual objects can establish constraints on the data that can be accessed, and further the virtual objects can be associated to a particular view. The virtual objects can be interpreted prior to any data access request insuring that a given perspective delivered by an information retrieval system is respected by any and all subsequent operations executed with a view.

According to one embodiment, synthetic data entities can be configured for processing by an information retrieval system. In one example, the synthetic data entity can be processed in a semantic layer as part of processing for responding to information requests made on the information retrieval system.

In one embodiment, an entity can be defined by reference to a parent entity. In some implementations, a root entity can be defined by default to include all the available data (native and synthetic), from which all other entities are descendents. Entities can be further defined by filter operations on the set of data made available by a parent entity. Aggregation operations can also be defined. An aggregation identifier can be set for each entity. For example, the aggregation can include a primary key. The primary key can be defined by a name assigned to the entity. The primary key can be stored by an identifier attribute for access to the entity or to perform operations against the entity, attributes, metadata, and/or data values from the entity.

Each entity can have a name. In some embodiments, named entities can be accessed in the same name space defined by other data objects stored in a collection of information. Entities can include relationships defined to other entities and/or data objects. Further, entities can include membership rules, which can refine, modify, or augment data attributes references by an entity. Expressed as one example of a programmatic language statement:

$$\text{Entity} = \left\{ \begin{array}{c} \text{Parent} \\ \text{Filter} \\ \text{Aggregation} \end{array} \right\}, \text{HAS} \left\{ \begin{array}{c} \text{Name} \\ \text{Relationships} \\ \text{Membership Rules} \end{array} \right\}$$

A defined entity can include the set of attributes defined by a parent, filtered by any filter operations, identified by an aggregation, accessible by name, including any relationship, and modified any membership rules.

The membership of the entity can be defined to include static designation of members of the entity, for example, attributes selected for inclusions in the entity. Membership rules can include dynamic operations to establish/modify attribute membership in the entity dynamically. Some membership rules can be defined based on a current data state viewed or accessed on an information retrieval system. For example, queries executed or navigation operations performed can return a subset of the data available on the information retrieval system, the subset of data and/or operations used to return the subset of data can define a navigation state. Dynamic membership rules can be implemented by an entity to modify a given navigation state. Including for example, definition of filters to ignore or respect.

The defined entity includes a set of data attributes each or which can include metadata definitions. The metadata definitions for attributes can be specific to the defined entity. In some embodiments, the metadata definitions for the attributes can be specific to an information retrieval component that access data from the information retrieval system.

In some examples, an attribute can include attribute precedence orderings, the attributes within an entity can also be grouped by group by definitions that can set an attribute, metadata, and/or data value to perform group by operation for other attributes/values.

Expressed as one example of a programmatic language statement:

$$\text{Attributes} = \left\{ \begin{array}{l} \text{BASE} - [\text{Group By, Visible}] \\ \text{DERIVED} - [\text{Expression}] \end{array} \right\},$$

$$\text{has Metadata} \left\{ \begin{array}{l} \text{Base} \\ \text{Entity Specific} \\ \text{Component Specific} \end{array} \right\}$$

where in one embodiment the set of attributes for an entity is defined by a base set of attributes available from a parent entity, limited by and filter/aggregation, modified by any relationship and membership rules. The base set of attributes can be modified by any defined group by operations. In some embodiments, entities can further define whether an attribute is visible for consumption by an application component, or visible in a user environment, for example. The base set of attributes can include derived attributes (e.g., derived by interpretation of virtual objects, virtual data elements, virtual data attributes, etc.). In some embodiments, the derived attributes can be modified or filtered by expressions defined for the entity. In one example, query language statements and/or a current navigation state can provide for filtering of a derived set of attributes.

Personalization

In some embodiments, a user may leverage references to attributes (both native and derived attributes), entities and attribute groups to modify their data views. For example, an information retrieval system can be configured to identify a user via access information and/or registration information. The identified user can be permitted to define their own personal view of data stored in a collection, and store the virtual objects that implement the personalized view as part of a user profile. In some embodiments, user presentation and other data reporting components of an information retrieval system can store personalized view modifications within semantic layer objects.

Tokenization Definitions

In some embodiments, an information retrieval system can be configured to define tokens to allow an end user to modify the behavior of an information access application or a set of components within the information access application. Tokenization, that is, association of the behaviors (which can be defined by virtual objects interpreted in a semantic layer), permits an end user to modify the behavior of the information access application with a single selection of the desired token. In some embodiments, the application level event definition necessary to perform such an action can be configured as an expression within the semantic layer.

An example can include a token associated with a definition of an attribute group. Selecting the token in, for example, a user interface results in redefinition of operations defined for a given entity. In another example, a virtual view of the data in a collection of information can be reconfigured based on the selection of a token associated with a defined attribute group. The operations defined by the tokenized group can be used to define initial constraints that limit the virtual view and/or can be used to redefine operations executed by the virtual view to deliver a new context of the data External System Relationships In some embodiments, virtual objects can define operations that are configured to access external data sources. External data sources can include data collections that are not managed by an information retrieval system. Some semantic layer implementations enable inclusion of an external data value, an external reference, or parameter as part of or as the result of an operation incorporated within a virtual object. Other embodiments can be configured to access and/or operate on the included external element as part of the query or analytics language syntax or semantics. The external data source can be called as part of run time processing operations, in response to data access requests. In some examples, data access requests can specifically target the return value from an external data source, external data value, etc. In some other embodiments, the information retrieval system and/or a semantic processing layer is configured to enable the external data element to be referenced via a native or virtual object, which may contain a value or contain a reference to a value.

Dynamic Query Language

In some embodiments, programming language statements can define semantic layer object behavior. In some examples, the programming language statements can include dynamic or parameterized aspects. In one example, an adjustable denominator can be used in calculations executed in a semantic layer. The adjustable denominator can be defined using programming language statements which can be configured to execute reference to an external metric. In one embodiment, an external metric can include data on "market share." Certain dimensions can be removed from an underlining navigation statement, and the removed dimensions can be defined/included locally resulting in the adjustable denominator. The denominator defined becomes dynamic response to the now location definition/inclusion of parameterized values. For example, the dimensions removed from a navigation statement can be defined locally as a WHERE statement within the definition of a semantic object. Resolution of the WHERE statement or other query language operation permits dynamic determination of the adjustable denominator.

Defining components of the navigation statement locally enables parameterization of the components of the navigation statement. In one example, the locally defined statements can be interpreted as part of a metric definition to help produce a part-to-whole calculation or can be interpreted for converting a monetary amount into local currency.

Join Relationships

Some embodiments utilize object relationships between the data stored in a collection, which in some examples, can be derived from combinations of grouping and filtering of a base set of records. In one embodiment, a data entity can be defined based on grouping operations and filtering operations performed on a base set of data. The data entity can also be combined with other data entities. In some embodiments, the information retrieval system enables relationship definition between database objects (virtual and native) and/or defined data entities that are true join relationships of normalized record sets. Some embodiments store these relationships in, for example, a semantic processing layer. The relationships can be stored as virtual data attributes, a set of virtual objects that define the join of the normalized record sets, etc. In other embodiments, the information retrieval system can be configured to provide an explicit join operator within the language definition used by semantic layer objects, for example as a programming language statement, that may utilize such stored relationships.

As discussed above, references to the data made available on an information retrieval system can be made based on entity definitions of the data. For example, data may be organized and referenced using a entity-relationship model. Diagrams of all the entity relationship defined in a collection of information can be defined and displayed by some embodiments, for example, as part of administering an information retrieval system and associated data. Entities can include grouping(s) of data (including for example groupings of data objects, data object attributes which describe the data object, etc.), relationships between data (e.g., join relationships), and can optionally include filtering operations associated with any defined grouping and/or relationship. Entities can be instantiated against base sets of data. An example of a base set includes the entirety of that data made available by a collection of information. However, base sets can be limited to subsets of data available on a collection. Membership in the base set can be defined dynamically for an entity. Membership rules can be configured to limit the data in the base set to subsets of the data made available by a collection of information.

According to some embodiments, the data made available by an information retrieval system can include data stored directly in a collection of information (directly stored data can be referred to as physical or native data) and also can include interpreted data (interpreted data can be referred to as virtual, synthetic, or semantic data) generated from the data stored directly in the collection of information, additionally, interpreted data can be generated based on data references external to the information retrieval system. In one embodiment, an entity can be defined to include or be any one or combination of a virtual object, a virtual group object, or a virtual data attribute, a virtual data element, etc. An entity can also include any combination of native data and/or interpreted data. A semantic entity can reference or include interpreted data. The interpreted data references and/or an operations associated with them can be processed by an interpretation layer of an information retrieval system. The interpretation layer can include a semantic layer configured to process or resolve any data interpretation operations (e.g., FIG. 1, 116).

According to some embodiments, the user interfaces described above can be used to define any synthetic data, including for example, definition of virtual objects, definition of virtual attributes, definition of enhanced metadata for data attributes, definition of virtual groups.

In one embodiment, definition of a virtual object can proceed similar to the definition of an entity in a user interface (e.g., interface 1100). In one example, rather than showing a parent entity, a user interface can display data and/or data attributes for a current navigation state or a current data state on an information retrieval system. A set of available data objects can be displayed for selection in a user interface. Additionally, a query or navigation selections made to reach the current navigation state or current data state can be displayed. A user can modify the query or navigation selections to modify the set of available data objects and data attributes. In some embodiments, a user can define a set of data for a virtual object, one or more operation, and each operation can be performed on any portion of the set of data. Virtual objects can also be defined with parent-child relationships and/or other hierarchical relationships. The relationships can be used, for example, to define an initial set of data, which can be modified by user selection.

Virtual data objects and virtual group objects can include filter operations, and can be configured to dynamically define their membership as discussed above. In some examples, membership can be defined by static selection, in other dynamical membership rules can be executed, and in yet others various combinations of static and dynamic membership can be used. In some embodiments, virtual data objects, virtual group objects, and virtual data attributes can be defined using programming language statements entered in a user interface. The statements can define arithmetic and/or logical operations. The statement can define navigation states on which the virtual objects should be interpreted. In some embodiments, programming language statements can be interpreted against current data states of an information retrieval system and are executed/interpreted by the semantic layer in response to a match to a defined navigation state or current data state in the system. In one example, the programming language statement can define triggers, upon which a given virtual object can be triggered.

Attribute metadata can be defined in a user interface and stored as virtual data (e.g., virtual data object, virtual data attribute, virtual data group, etc.) resolved in a semantic layer. The attribute metadata can be augmented metadata as discussed above. Definition of attribute metadata can also include programming language statements configured to resolve, for example, units, bounding information, data ranges, expected formats, etc.

General Purpose Computer System

Various embodiments discussed may be implemented on one or more specially programmed general purpose computer systems, including for example systems 100, FIGS. 1 and 300, FIG. 3. These computer systems may be, for example, general-purpose computers such as those based on Intel PENTIUM-type processor, Motorola PowerPC, AMD Athlon or Turion, Sun UltraSPARC, Hewlett-Packard PA-RISC processors, or any other type of processor, including multi-core processors. It should be appreciated that one or more of any type computer system may be used to implement an information retrieval system with synthetic/semantic data resolution. Further, the information retrieval system may be located on a single computer or may be distributed among a plurality of computers attached by a communications network.

A general-purpose computer system according to one embodiment of the invention is specially configured to perform any one or more of the described functions, including but not limited to, creating, storing, parsing, matching, evaluating, and displaying synthetic data which can include virtual objects, virtual data elements, virtual groupings from processing of the synthetic data in response to data access requests made on an information retrieval system, accessing one or more collections of data, wherein the collections of data can include a variety of organizations, a variety of data structures, as well as enabling just in time processing of synthetic data, processing of synthetic data at access, optimization of synthetic data processing, association of synthetic/virtual data objects with machine executable code, caching of results returned by synthetic/virtual objects, etc., and the invention is not limited to having any particular function or set of functions. Some additional functions include, faceted navigation of the one or more collections of information, generation and display of a faceted navigation interface, providing a synthetic data generation interface, virtual object definition, virtual data definition, etc.

Figure 9:
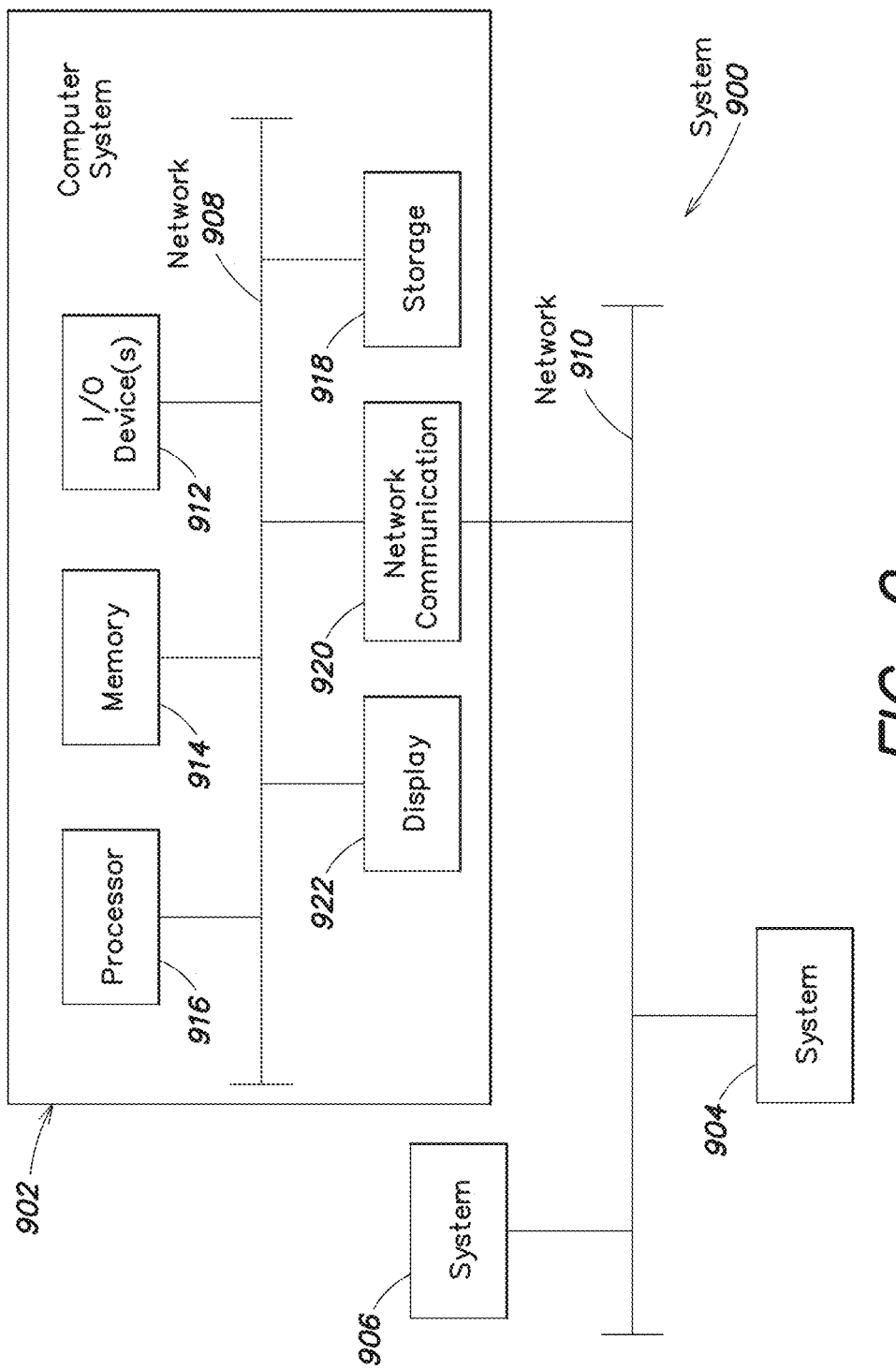
FIG. 9 is a block diagram of an example architecture for a general purpose computer system on which various aspects of the invention can be implemented.

FIG. 9 shows a block diagram of a general purpose computer and network system 900 in which various aspects of the present invention may be practiced. For example, various aspects of the invention may be implemented as specialized software executing in one or more computer systems including general-purpose computer systems, 902-906, shown in FIG. 9. Various embodiments of a information repository can be implemented on general purpose computer systems (e.g., 902 and/or 904-906). Computer system 902 may include a processor 916 connected to one or more memory devices 914, such as a disk drive, memory, or other devices for storing data. Memory 914 is typically used for storing programs and data during operation of the computer system. Components of computer system 902 may be coupled by an interconnection mechanism such as network 908, which may include one or more busses (e.g., between components that are integrated within a same machine) and/or a network 910 (e.g., between components that reside on separate discrete machines). The interconnection mechanism enables communications (e.g., data, instructions) to be exchanged between system components of the system.

Computer system 902 also includes one or more input/output (I/O) devices 912, for example, a keyboard, mouse, trackball, microphone, touch screen, a printing device, display screen (e.g., 922), speaker, etc. In addition, computer system may contain one or more interfaces (e.g., network communication device 920) that connect computer system to a communication network 908 (in addition or as an alternative to the network 910).

The storage system, typically includes a computer readable and writeable nonvolatile recording medium in which signals are stored that define a program to be executed by the processor or information stored on or in the medium to be processed by the program. The medium may, for example, be a disk or flash memory. Typically, in operation, the processor 916 causes data to be read from the nonvolatile recording medium into another memory that allows for faster access to the information by the processor than does the medium. This memory is typically a volatile, random access memory such as a dynamic random access memory (DRAM) or static memory (SRAM). The memory may be located in storage system 918, as shown, or in memory system 914. The processor 916 generally manipulates the data within the memory 914, and then copies the data to the medium associated with storage after processing is completed. A variety of mechanisms are known for managing data movement between the medium and integrated circuit memory and the invention is not limited thereto. The invention is not limited to a particular memory system 914 or storage system 916.

The computer system may include specially-programmed, special-purpose hardware, for example, an application-specific integrated circuit (ASIC). Aspects of the invention may be implemented in software, hardware or firmware, or any combination thereof. Further, such methods, acts, systems, system elements and components thereof may be implemented as part of the computer system described above or as an independent system component or processing layer.

Although the computer system of FIG. 9 is shown by way of example as one type of computer system upon which various aspects of the invention may be practiced, it should be appreciated that aspects of the invention are not limited to being implemented on the computer system as shown. Various aspects of the invention may be practiced on one or more computers having a different architectures or components that that shown in FIG. 9. The computer system can provide access to data as illustrated in FIGS. 2A-B, FIG. 4 and FIGS. 18A and 18B, and can execute the processes flows illustrated for example in FIGS. 5-8, and/or execute components or processing layers of an information retrieval system (e.g., 100 and 300) and can be also configured to execute any of the processes or parts of process flows illustrated in FIGS. 5-8. The processes can also include other processes, sub-processes, and may be executed separately and/or in conjunction. Further the computer system can provide access to any one of the interfaces discussed above, including for example, user interface 1100-1700.

The computer system 902 may be a general-purpose computer system that is programmable using a high-level computer programming language. The computer system may be also implemented using specially programmed, special purpose hardware. In the computer system, processor is typically a commercially available processor such as the well-known Pentium class processor available from the Intel Corporation. Many other processors are available including multi-core processors and microprocessors. Such a processor usually executes an operating system which may be, for example, the Windows-based operating systems (e.g., Windows NT, Windows XP, Windows VISTA, Windows 7 operating systems) available from the Microsoft Corporation, MAC OS System X operating system available from Apple Computer, one or more of the Linux-based operating system distributions (e.g., the Enterprise Linux operating system available from Red Hat Inc.), the Solaris operating system available from Sun Microsystems, or UNIX operating systems available from various sources. Many other operating systems may be used, and the invention is not limited to any particular operating system.

The processor and operating system together define a computer platform for which application programs in high-level programming languages are written. It should be understood that the invention is not limited to a particular computer system platform, processor, operating system, or network. Also, it should be apparent to those skilled in the art that the present invention is not limited to a specific programming language or computer system. Further, it should be appreciated that other appropriate programming languages and other appropriate computer systems could also be used.

One or more portions of the computer system may be distributed across one or more computer systems coupled to a communications network. These computer systems also may be general-purpose computer systems. For example, various aspects of the invention, for example, system components, may be distributed among one or more computer systems (e.g., servers) configured to provide a service to one or more client computers, or to perform an overall task as part of a distributed system, including, for example, data return from one or more collections of information, and definition of synthetic data, including virtual objects, virtual data attributes and/or virtual attribute values, as well as virtual groupings of data. For example, various aspects of the invention may be performed on a client-server or multi-tier system that includes components distributed among one or more server systems that perform various functions according to various embodiments of the invention including creating, defining, storing, parsing, matching, evaluating, and displaying synthetic data which can include virtual objects, virtual data elements, virtual groupings from processing of the synthetic data in response to data access requests made on an information retrieval system, accessing one or more collections of data, wherein the collections of data can include a variety of organizations, a variety of data structures, as well as enabling just in time processing of synthetic data, processing of synthetic data at access, optimization of synthetic data processing, association of synthetic/virtual data objects with machine executable code, caching of results returned by synthetic/virtual objects, etc., and the invention is not limited to having any particular function or set of functions. Some additional functions include, faceted navigation of the one or more collections of information, generation and display of a faceted navigation interface, providing a synthetic data generation interface, virtual object definition, virtual data definition, as examples.

Other system components or processing layers can be configured to permit users to interact with one or more collections of information, providing refinements, navigation options, attribute selection as part of or as a set of results returned from a collection of information, etc. These components may be executable, intermediate (e.g., IL) or interpreted (e.g., Java) code which communicate over a communication network (e.g., the Internet) using a communication protocol (e.g., TCP/IP).

It should be appreciated that the invention is not limited to executing on any particular system or group of systems. Also, it should be appreciated that the invention is not limited to any particular distributed architecture, network, or communication protocol.

Various embodiments of the present invention may be programmed using an object-oriented programming language, such as Java, C++, Ada, or C# (C-Sharp). Other object-oriented programming languages may also be used. Alternatively, functional, scripting, and/or logical programming languages may be used. Various aspects of the invention may be implemented in a non-programmed environment (e.g., documents created in HTML, XML or other format that, when viewed in a window of a browser program, render aspects of a graphical-user interface (GUI) or perform other functions). Various aspects of the invention may be implemented as programmed or non-programmed elements, or any combination thereof.

Various aspects of this system can be implemented by one or more systems within the computer system 902. For instance, an information retrieval system may be configured as a distributed system (e.g., client server, multi-tier system). In one example, an information retrieval system includes software processes executing on a system associated with a user (e.g., a client system). These systems may permit the user to input queries and/or selection navigation options in a user interface designed to return data results from one or more collections of information, define synthetic data, including virtual objects, virtual data elements, virtual data attributes, virtual groupings, access and virtual object to resolve complicated data relationships, etc. Further, client systems can be associated with user or processing entities who access, for example, an information retrieval system to interact with one or more collections of information that include new data sources, that can be received with new data organizations, new data structures, wherein the system is configured to permit processing of the synthetic data against the received data without, for example, requiring redefinition of virtual objects or other synthetic data that can access the received data.

Figure 10:
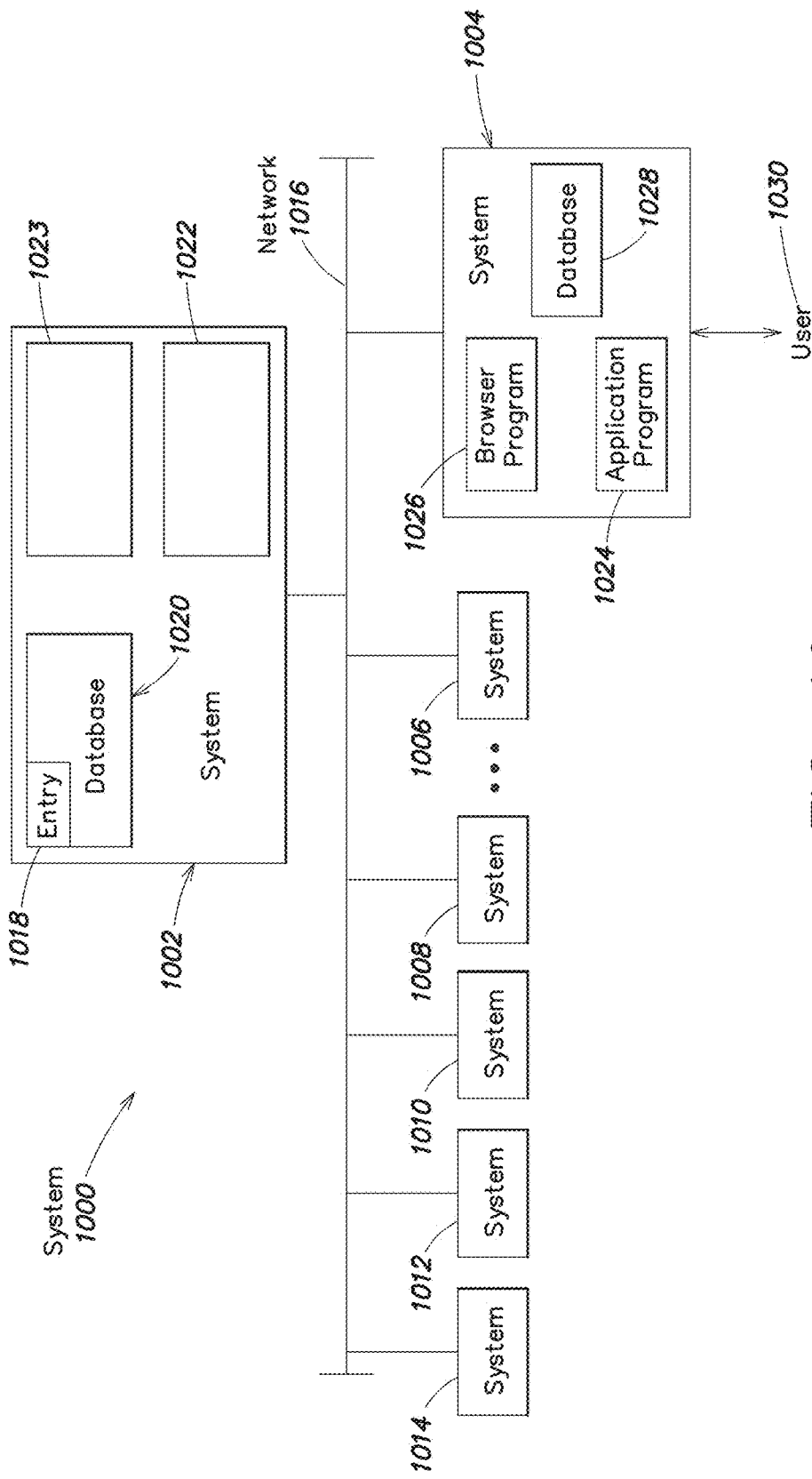
FIG. 10 is a block diagram of an example architecture for a general purpose computer system on which various aspects of the invention can be implemented.

FIG. 10 shows an architecture diagram of an example system according to one embodiment of the invention. It should be appreciated that FIG. 10 is used for illustration purposes only, and that other architectures may be used to facilitate one or more aspects of the present invention.

As shown in FIG. 10, a distributed system 1000 can be composed of a plurality of general purpose computer system (e.g., 1002-1014) specially configured to conduct functions of a information retrieval system, including, but not limited to, accessing one or more collections of information, processing synthetic data in conjunction with data records, store in the collection(s), processing synthetic data as data records in the one or more collections, returning results including refinements from the collection(s), wherein synthetic data, including virtual objects, virtual data elements, and/or virtual groupings can be the source or suggestion for a refinement, defining synthetic data, providing a user interface for defining synthetic data, etc. The distributed system may include one or more general purpose computer systems (e.g., 1002-1014) coupled by a communication network 1016. Such computer systems may be, for example, general-purpose computer systems as discussed above with reference to FIG. 9.

In one embodiment of the present invention, a system 1002 stores attributes associated with synthetic data, attributes associated with the execution of operations for synthetic data, attributes associated with queries and/or navigation operations performed on one or more collections of information, attributes associated with external sources of information, execution optimization data, machine executable processing language associated with synthetic data, etc. Users can be associated with an entry 1018 in the database 1020, additional entries can store information associated with each user, for example, including authentication information associated with a respective user, synthetic data defined by a respective user, security and/or data access permissions associated with a respective user, etc. Various embodiments can employ user databases organized by record, although other database models can be used to store information. In some examples, a relational database model is implemented, and in others non-relational database models can be employed for database 1020.

Further, the system 1002 performs functions associated with the displaying and generation of user interfaces configured to allow users to interact with one or more collections of information, define synthetic data resolved against the one or more collections of information and/or external information sources, processing of synthetic data in response to request for data access to the one or more collections of information, and other functions associated with returning responsive results to information access requests, including just in time processing of query and/or navigation operations, just in time processing of synthetic data, determination of refinements presented with results, validity checking of synthetic data, bounds checking of results and/or synthetic data, caching of prior execution of query, navigation, and/or synthetic data operations, generation of machine code to associate with or based on prior execution of query, navigation, and/or synthetic data operations, etc. The system 1002 can also be configured to access external information sources over for example a communication network to augment the one or more collections of information, for example, in response to operations defined in synthetic data. In some embodiments, system 1002 can also be configured to instantiate and execute system components or processing layers for returning results for one or more collections of information including synthetic data. The various components or processing layers can be configured to perform the functions and/or operations and/or execute the processes, in whole or in part, as discussed above.

The system 1002 may include a server process 1022 and/or program 1023 that responds to requests from one or more client programs. Process 1022 may include, for example, an HTTP server or other server-based process (e.g., a database server process, XML, server, peer-to-peer process) that interfaces to one or more client programs distributed among one or more client systems, for example 1010-1014, to provide access to users to the information repository and/or deliver results returned from one or more collections of information during, for example, user interaction with a faceted navigation interface.

According to one embodiment, client programs 1024 may be capable of permitting a user 1030 to interact with a faceted navigation interface to return results and/or recommendations for interaction with the returned result, include for example, refinement options. Such client programs may include, for example, any type of operating system and/or application program capable of communicating with the system 1002 through a network. In one particular instance, a client system 1004 may include a browser program (e.g., browser program 1026) that communicates with the server process 1022 or program 1023 using one or more communication protocols (e.g., HTTP over a TCP/IP-based network, XML, requests using HTTP through an Ajax client process, distributed objects, https, or other secure or non-secure communication protocol).

In some settings, the system 1002 can include locally executable components that can access or store data and/or activity as it takes place on system 1004, for example, in database 1028. In some examples, a user 1030 can download and install the locally executable components on system 1004 to enable access to an information retrieval system. In other examples, system 1002 can be configured to automatically transmit the locally executable component(s) to a user system, e.g., 1004.

Although it is shown by way of example that a browser program 1026 may be used to access the information retrieval system, it should be appreciated that other program types may be used. The client program may be, for example, a thin client including an interface for accessing an information retrieval system to access one or more collections of information, define synthetic data, and preformed faceted navigation operations on accessed data. Alternatively, the client may be a scripted program, or any other type of program having the capability of transferring data. According to one embodiment, such client programs may, for example, be downloaded and installed over the network. Further, these client programs may be stored and distributed by system 1002 in the form of one or more software programs, including for example, browser plug-ins, active x objects, applets, and java code.

Having now described some illustrative embodiments of the invention, it should be apparent to those skilled in the art that the foregoing is merely illustrative and not limiting, having been presented by way of example only. Numerous modifications and other illustrative embodiments are within the scope of one of ordinary skill in the art and are contemplated as falling within the scope of the invention. In particular, although many of the examples presented herein involve specific combinations of method acts, system elements, or processing layers, it should be understood that those acts, operations, and those elements may be combined in other ways to accomplish the same objectives. Acts, operations, elements and features discussed only in connection with one embodiment are not intended to be excluded from a similar role in other embodiments. Further, for the one or more means-plus-function limitations recited in the following claims, the means are not intended to be limited to the means disclosed herein for performing the recited function, but are intended to cover in scope any means, known now or later developed, for performing the recited function.

As used herein, whether in the written description or the claims, the terms "comprising", "including", "containing", "characterized by" and the like are to be understood to be open-ended, i.e., to mean including but not limited to. Only the transitional phrases "consisting of" and "consisting essentially of", respectively, shall be closed or semi-closed transitional phrases, as set forth, with respect to claims, in the United States Patent Office Manual of Patent Examining Procedures (Eighth Edition 2nd Revision, May 2004), Section 2111.03.

Use of ordinal terms such as "first", "second", "third", "a", "b" "c" etc., in the claims to modify or otherwise identify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

What is claimed is:

1. A method of accessing data comprising a collection of database objects stored in a database, the database comprising a plurality of attributes and a plurality of data values each stored within the database within one of the plurality of attributes, the method comprising:

in response to a previous query of the data values of the database using first query terms, generating first query results and generating, at a user device that is remotely coupled to the database via a communication network, selectable displayed refinement options, the selectable displayed refinement options comprising a synthetic refinement option which comprises a mathematical operation that is applied to retrieved data values, and a data refinement object;

in response to a selection, at the user device, of the data refinement object, generating second query terms and performing a second query of the data values of the database using the second query terms and providing results of the second query, the data refinement option corresponding to one or more second attributes of the plurality of attributes of the database, and the results of the second query comprising second query data values stored in the database within the one or more second attributes; and in response to a selection, at the user device, of the synthetic refinement option, generating third query terms and performing a third query of the data values of the database using the third query terms to retrieve third query data values from the database, and performing, at an interpretation layer, mathematical operations on the third query data values that are retrieved from the database, and providing resulting augmented data values from the mathematical operations to the user device, the resulting augmented data values augmented from the third query data values after the third query data values are retrieved from the database, the synthetic refinement object not corresponding to any of the plurality of attributes of the database and the augmented data values having different values than the third query data values and not stored within the database within one of the plurality of attributes of the database.

2. The method of claim 1, wherein the mathematical operation comprises at least one of an arithmetic operation or a logical operation.

3. The method of claim 1, further comprising generating additional refinement options based on the augmented data values from the mathematical operations.

4. The method of claim 1, further comprising determining a context of the synthetic refinement option, wherein the augmented data values from the mathematical operations is based at least on the determined context.

5. The method of claim 4, wherein the context of the synthetic refinement option is based on the previous query of the data.

6. The method of claim 1, wherein the synthetic refinement option comprises a compilation of programming language statements.

7. The method of claim 1, wherein the synthetic refinement option comprises an attribute defining who can access particular fields of the data.

8. The method of claim 1, wherein the synthetic refinement option comprises one or more attributes defined by metadata.

9. A non-transitory computer readable medium having instructions stored thereon that, when executed by a processor, cause the processor to access data comprising a collection of database objects stored in a database, the database comprising a plurality of attributes and a plurality of data values each stored within the database within one of the plurality of attributes, the accessing comprising:

in response to a previous query of the data values of the database using first query terms, generating first query results and generating, at a user device that is remotely coupled to the database via a communication network, selectable displayed refinement options, the selectable displayed refinement options comprising a synthetic refinement option which comprises a mathematical operation that is applied to retrieved data values, and a data refinement object;

in response to a selection, at the user device, of the data refinement object, generating second query terms and performing a second query of the data values of the database using the second query terms and providing results of the second query, the data refinement option corresponding to one or more second attributes of the plurality of attributes of the database, and the results of the second query comprising second query data values stored in the database within the one or more second attributes; and in response to a selection, at the user device, of the synthetic refinement option, generating third query terms and performing a third query of the data values of the database using the third query terms to retrieve third query data values from the database, and performing, at an interpretation layer, mathematical operations on the third query data values that are retrieved from the database, and providing resulting augmented data values from the mathematical operations to the user device, the resulting augmented data values augmented from the third query data values after the third query data values are retrieved from the database, the synthetic refinement object not corresponding to any of the plurality of attributes of the database and the augmented data values having different values than the third query data values and not stored within the database within one of the plurality of attributes of the database.

10. The computer readable medium of claim 9, wherein the mathematical operation comprises at least one of an arithmetic operation or a logical operation.

11. The computer readable medium of claim 9, further comprising generating additional refinement options based on the augmented data values from the mathematical operations.

12. The computer readable medium of claim 9, further comprising determining a context of the synthetic refinement option, wherein the augmented data values from the mathematical operations is based at least on the determined context.

13. The computer readable medium of claim 12, wherein the context of the synthetic refinement option is based on the previous query of the data.

14. The computer readable medium of claim 9, wherein the synthetic refinement option comprises a compilation of programming language statements.

15. The computer readable medium of claim 9, wherein the synthetic refinement option comprises an attribute defining who can access particular fields of the data.

16. The computer readable medium of claim 9, wherein the synthetic refinement option comprises one or more attributes defined by metadata.

17. A database query system comprising:
a processor; and
a storage device coupled to the processor that stores instructions executed by the processor to access data comprising a collection of database objects stored in a database, the database comprising a plurality of attributes and a plurality of data values each stored within the database within one of the plurality of attributes, the accessing comprising:

in response to a previous query of the data values of the database using first query terms, generating first query results and generating, at a user device that is remotely coupled to the database via a communication network, selectable displayed refinement options, the selectable displayed refinement options comprising a synthetic refinement option which comprises a mathematical operation that is applied to retrieved data values, and a data refinement object;

in response to a selection, at the user device, of the data refinement object, generating second query terms and performing a second query of the data values of the database using the second query terms and providing results of the second query, the data refinement option corresponding to one or more second attributes of the plurality of attributes of the database, and the results of the second query comprising second query data values stored in the database within the one or more second attributes; and in response to a selection, at the user device, of the synthetic refinement option, generating third query terms and performing a third query of the data values of the database using the third query terms to retrieve third query data values from the database, and performing, at an interpretation layer, mathematical operations on the third query data values that are retrieved from the database, and providing resulting augmented data values from the mathematical operations to the user device, the resulting augmented data values augmented from the third query data values after the third query data values are retrieved from the database, the synthetic refinement object not corresponding to any of the plurality of attributes of the database and the augmented data values having different values than the third query data values and not stored within the database within one of the plurality of attributes of the database.

18. The database query system of claim 17, wherein the mathematical operation comprises at least one of an arithmetic operation or a logical operation.

19. The database query system of claim 17, further comprising generating additional refinement options based on the augmented data values from the mathematical operations.

20. The database query system of claim 17, further comprising determining a context of the synthetic refinement option, wherein the augmented data values from the mathematical operations is based at least on the determined context.

* * * * *